(12) United States Patent
Adamson et al.

(10) Patent No.: US 7,718,317 B2
(45) Date of Patent: May 18, 2010

(54) ELECTRODE ACTIVE MATERIAL AND METHOD OF MAKING THE SAME

(75) Inventors: George Adamson, Henderson, NV (US); Jeremy Barker, Oxfordshire (GB); Gerbrand Ceder, Cambridge, MA (US); Ming Dong, Henderson, NV (US); Dane Morgan, Cambridge, MA (US); M. Yazid Saidi, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 1698 days.

(21) Appl. No.: 10/741,257

(22) Filed: Dec. 19, 2003

(65) Prior Publication Data

US 2004/0131939 A1 Jul. 8, 2004

Related U.S. Application Data

(60) Provisional application No. 60/435,144, filed on Dec. 19, 2002.

(51) Int. Cl.
*H01M 4/58* (2010.01)

(52) U.S. Cl. .............. 429/231.1; 429/231.95; 429/231.5; 429/231.6; 429/224; 429/223; 429/220; 429/221; 429/225

(58) Field of Classification Search .............. 429/231.1, 429/231.95, 231.5, 231.6, 224, 223, 220, 429/221, 225
See application file for complete search history.

(56) References Cited

U.S. PATENT DOCUMENTS

| | | | |
|---|---|---|---|
| 5,538,814 A | 7/1996 | Kamauchi et al. |
| 5,576,121 A | 11/1996 | Yamada et al. |
| 5,614,334 A | 3/1997 | Kamauchi et al. |
| 5,871,866 A | 2/1999 | Barker et al. |
| 5,910,382 A | 6/1999 | Goodenough et al. |
| 6,085,015 A | 7/2000 | Armand et al. |
| 6,136,472 A | 10/2000 | Barker et al. |
| 6,153,333 A | 11/2000 | Barker |
| 6,387,568 B1 | 5/2002 | Barker et al. |
| 6,391,493 B1 | 5/2002 | Goodenough et al. |
| 6,514,640 B1 | 2/2003 | Armand et al. |

(Continued)

FOREIGN PATENT DOCUMENTS

CA          2200998          3/1997

(Continued)

OTHER PUBLICATIONS

Chung et al. "Electronically conductive phospho-olivines as lithium storage electrodes", Nature Materials, Sep. 22, 2002, 1(2), pp. 123-128.*

(Continued)

*Primary Examiner*—Laura S Weiner
(74) *Attorney, Agent, or Firm*—Cynthia S. Kovacevic; Brian T. Mangum; Roger A. Williams

(57) ABSTRACT

The invention provides an electrochemical cell which includes a first electrode and a second electrode which is a counter electrode to said first electrode, and an electrolyte material interposed there between. The first electrode includes an alkali metal phosphorous compound doped with an element having a valence state greater than that of the alkali metal.

4 Claims, 11 Drawing Sheets

U.S. PATENT DOCUMENTS

| | | | |
|---|---|---|---|
| 6,656,635 B2 * | 12/2003 | Okawa et al. | 429/231.1 |
| 6,720,113 B2 * | 4/2004 | Goto et al. | 429/231.95 |
| 6,814,764 B2 * | 11/2004 | Hosoya et al. | 429/231.5 |
| 6,991,873 B2 * | 1/2006 | Sakai et al. | 429/224 |
| 7,122,272 B2 * | 10/2006 | Okawa et al. | 429/221 |
| 7,255,957 B2 * | 8/2007 | Takahashi et al. | 429/231.1 |
| 2002/0086214 A1 | 7/2002 | Barker et al. | |
| 2002/0122984 A1 | 9/2002 | Sakai et al. | |
| 2002/0168573 A1 | 11/2002 | Baker et al. | |
| 2002/0192553 A1 | 12/2002 | Barker et al. | |
| 2002/0195591 A1 | 12/2002 | Ravet et al. | |
| 2003/0013019 A1 | 1/2003 | Barker et al. | |
| 2003/0027049 A1 | 2/2003 | Barker et al. | |
| 2003/0077514 A1 | 4/2003 | Barker et al. | |
| 2003/0082446 A1 | 5/2003 | Chiang et al. | |
| 2003/0082454 A1 | 5/2003 | Armand et al. | |
| 2003/0099884 A1 | 5/2003 | Chiang et al. | |
| 2003/0129492 A1 | 7/2003 | Barker et al. | |
| 2003/0170542 A1 * | 9/2003 | Barker et al. | 429/231.95 |
| 2003/0190527 A1 * | 10/2003 | Pugh et al. | 429/231.95 |
| 2003/0190528 A1 * | 10/2003 | Saidi et al. | 429/231.95 |
| 2003/0215714 A1 | 11/2003 | Barker et al. | |
| 2004/0005265 A1 | 1/2004 | Chiang et al. | |
| 2004/0018430 A1 | 1/2004 | Chiang et al. | |
| 2004/0033360 A1 | 2/2004 | Armand et al. | |
| 2004/0086445 A1 | 5/2004 | Armand et al. | |
| 2005/0034993 A1 | 2/2005 | Gozdz et al. | |
| 2005/0233219 A1 | 10/2005 | Gozdz et al. | |
| 2007/0134554 A1 * | 6/2007 | Armand et al. | 429/231.95 |

FOREIGN PATENT DOCUMENTS

| | | |
|---|---|---|
| CA | 2307119 | 4/2000 |
| CA | 2270771 | 10/2000 |
| EP | 1 049 182 A2 | 11/2000 |
| EP | 1 195 827 A2 | 4/2002 |
| EP | 1 195 837 A2 | 4/2002 |
| EP | 1 195 838 A2 | 4/2002 |
| JP | 09 134724 A1 | 5/1997 |
| JP | 11 025983 A1 | 1/1999 |
| JP | 2001 307726 A1 | 4/2001 |
| JP | 2001 085010 A1 | 7/2001 |
| JP | 2002 216755 A1 | 8/2002 |
| WO | WO 97/40541 A1 | 10/1997 |
| WO | WO 01/53198 A1 | 7/2001 |
| WO | WO 01/54212 A1 | 7/2001 |
| WO | WO 01/77501 A2 | 10/2001 |
| WO | WO 01/84655 A1 | 11/2001 |
| WO | WO 02/27823 A1 | 4/2002 |
| WO | WO 02/27824 A1 | 4/2002 |
| WO | WO 03/038930 A2 | 5/2003 |
| WO | WO 03/056646 A1 | 7/2003 |
| WO | WO 03/077335 A1 | 9/2003 |
| WO | WO 03/085757 A1 | 10/2003 |
| WO | WO 03/085771 A1 | 10/2003 |
| WO | WO 03/088383 A1 | 10/2003 |
| WO | WO 03/099715 A1 | 12/2003 |

OTHER PUBLICATIONS

Butt et al., "Lithium Metal Phosphate Cathodes for Li Secondary Batteries" J. Australas. Ceram. Soc., 34(1), pp. 60-65 (1998).

Okada et al., "Characteristics of 3-D Framework Cathodes with $(XO_4)^{n-}$ Polyanions" Prog. Batteries Battery Mater., vol. 16, pp. 302-308 (1997).

Vaknin et al., "Weakly (X=0) and Randomly (x=0.033) Coupled Ising Antiferromagnetic Planes in $(Li_{1-3x}Fe_R)NiPO_4$ compounds" Phys. Rev. B: Condens. Matter Mater. Phys., vol. 60(2), pp. 1100-1110 (1999).

Goni, A., et al., "$^7Li$ and $^{31}P$ Nuclear Magnetic Resonance Studies of $Li_{1-3x}Mg Fe_xPO_4$," J. Applied Phys., vol. 84(1), pp. 416-421 (1998).

Aatiq, A., et al., "Structural and Electrochemical Study of $Li_{0.5}Mn_{0.5}Ti_{1.5}Cr_{0.5}(PO_4)_3$" J. Solid State Chem., vol. 158, pp. 169-174 (2001).

Aatiq, A., et al., "Structural and Lithium Intercalation Studies of $Li_{(0.5-x)}Ca_xTi_2(PO_4)_3$ Phases ($0 \leq x \leq 0.50$)" Solid State Ionics, vol. 150, pp. 391-405 (2002).

Aatiq, A., et al., "Structural and Electrochemical Study of $Li_{(2-x)}Mn_{(1-x)}TiCr(PO_4)_3$ ($0 \leq x \leq 0.50$) with NASICON-like Structure" Ann. Chim. Sci. Mat, vol. 23, pp. 121-124 (1998).

Yamada et al., "Olivine Type Cathodes—Achievements and Problems" J. Power Sources, vol. 119-121, pp. 232-238 (Jun. 1, 2003).

Chung et al., "Electronically Conductive Phospo-Olivines as Lithium Storage Electrodes," Nature Materials, vol. 1(2), pp. 123-128 (Oct. 2002) (abstract only).

Yamada et al., "Crystal Chemistry of the Olivine-type $Li(Mn_y Fe_{1-y})PO_4$ and $Mn_yFe_{1-y})PO_4$ as Possible 4V Cathode Materials for Lithium Batteries," J. Electrochemical Society, vol. 148(8), pp. A960-967 (2001).

Padhi et al., "Phospho-Olivines as Positive Electrode Materials for Rechargeable Lithium Batteries," J. Electrochemical Society, vol. 144(4), pp. 1188-1194 (Apr. 1997).

Supplemental Partial European Search Report for EP 03 79 3455, dated Aug. 19, 2005.

\* cited by examiner

ELECTRODE ACTIVE MATERIAL AND METHOD OF MAKING THE SAME

This Application claims the benefit of U.S. Provisional Application No. 60/435,144, filed Dec. 19, 2002.

FIELD OF THE INVENTION

This invention relates to improved electrode active materials, methods for making such improved active materials, and electrochemical cells employing such improved active materials.

BACKGROUND OF THE INVENTION

A battery consists of one or more electrochemical cells, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

Such batteries generally include an electrochemically active material having a crystal lattice structure or framework from which ions can be extracted and subsequently reinserted, and/or permit ions to be inserted or intercalated and subsequently extracted.

Recently, three-dimensionally structured compounds comprising polyanions (e.g., $(SO_4)^{n-}$, $(PO_4)^{n-}$, $(AsO_4)^{n-}$, and the like), have been devised as viable alternatives to oxide-based electrode materials such as $LiM_xO_y$. Examples of such polyanion-based materials include the ordered olivine $LiMPO_4$ compounds, wherein M=Mn, Fe, Co or the like. Other examples of such polyanion-based materials include the NASICON $Li_3M_2(PO_4)_3$ compounds, wherein M=Mn, Fe, Co or the like. Although these classes of lithiated polyanion-based compounds have exhibited some promise as electrode components, many such polyanion-based materials are not economical to produce, afford insufficient voltage, have insufficient charge capacity, exhibit low ionic and/or electrical conductivity, or lose their ability to be recharged over multiple cycles. Therefore, there is a current need for an electrode active material that exhibits greater charge capacity, is economical to produce, affords sufficient voltage, exhibits greater ionic and electrical conductivity, and retains capacity over multiple cycles.

SUMMARY OF THE INVENTION

The present invention provides novel electrode materials represented by the general formula:

$$[A_a, D_d]M_m(XY_4)_pZ_e,$$

wherein:
(i) A is selected from the group consisting of elements from Group I of the Periodic Table, and mixtures thereof, and $0<a\leq9$;
(ii) D is at least one element with a valence state of $\geq 2+$, and $0<d<1$;
(iii) M includes at least one redox active element, and $1\leq m\leq 3$;
(iv) $XY_4$ is selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:

(a) X' and X''' are each independently selected from the group consisting of P, As, Sb, Si, Ge, V, S, and mixtures thereof;
(b) X'' is selected from the group consisting of P, As, Sb, Si, Ge, V, and mixtures thereof;
(c) Y' is selected from the group consisting of a halogen, S, N, and mixtures thereof; and
(d) $0\leq x\leq 3$, $0\leq y\leq 2$, $0\leq z\leq 1$, and $1\leq p\leq 3$; and
(v) Z is OH, a halogen, or mixtures thereof, and $0\leq e\leq 4$;

wherein A, D, M, X, Y, Z, a, d, x, y, z, p and e are selected so as to maintain electroneutrality of the material.

This invention also provides electrodes which utilize an electrode active material of this invention. Also provided are batteries having a first electrode that includes the electrode active material of this invention; a second counter-electrode having a compatible active material; and an electrolyte interposed there between. In a preferred embodiment, the novel electrode active material of this invention is used as a positive electrode (cathode) active material, reversibly cycling alkali metal ions with a compatible negative electrode (anode) active material.

DETAILED DESCRIPTION OF THE PREFERRED EMBODIMENTS

Figure 1:
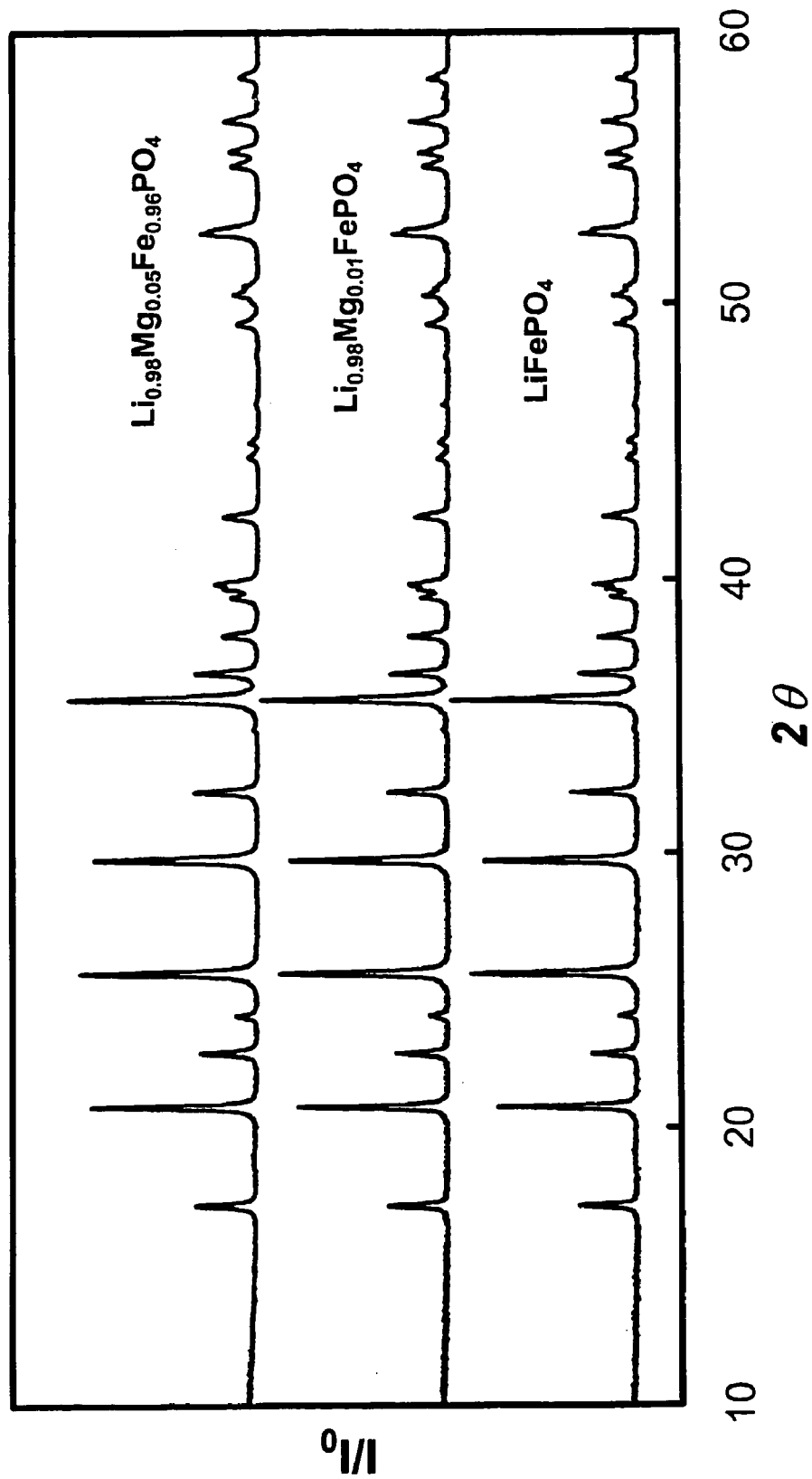
FIG. 1 shows the Reitvelt refined CuKα ($\lambda$=1.5405 Å with a scattering angle of 2θ) x-ray diffraction patterns collected for $LiFePO_4$, $Li_{0.98}Mg_{0.01}FePO_4$, and $Li_{0.98}Mg_{0.05}Fe_{0.96}PO_4$ active materials.

It has been found that the novel electrode materials, electrodes, and batteries of this invention afford benefits over such materials and devices among those known in the art. Such benefits include one or more of increased capacity, enhanced cycling capability, enhanced reversibility, enhanced ionic conductivity, enhanced electrical conductivity, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

The present invention provides electrode active materials for use in an electricity-producing electrochemical cell. Each electrochemical cell includes a positive electrode, a negative electrode, and an electrolyte in ion-transfer relationship with each electrode. As used herein, the word "include," and its variants, is intended to be non-limiting, such that recitation of items in a list is not to the exclusion of other like items that may also be useful in the materials, compositions, devices, and methods of this invention. A "battery" refers to a device having one or more electricity-producing electrochemical cells. Two or more electrochemical cells may be combined in parallel or series, or "stacked," so as to create a multi-cell battery.

The electrode active materials of this invention may be used in the negative electrode, the positive electrode, or both. Preferably, the active materials of this invention are used in the positive electrode (As used herein, the terms "negative electrode" and "positive electrode" refer to the electrodes at which oxidation and reduction occur, respectively, during battery discharge; during charging of the battery, the sites of oxidation and reduction are reversed). The terms "preferred" and "preferably" as used herein refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

Electrode Active Materials of the Present Invention:

The present invention is directed to a novel alkali metal-containing electrode active material. In one embodiment, the novel active material of the present invention is represented by the nominal general formula (I):

$$[A_a, D_d]M_m(XY_4)_pZ_e \quad (I)$$

The term "nominal general formula" refers to the fact that the relative proportion of atomic species may vary slightly on the order of 2 percent to 5 percent, or more typically, 1 percent to 3 percent. The composition of A, D, M, $XY_4$ and Z of general formulas (I) through (V) herein, as well as the stoichiometric values of the elements of the active material, are selected so as to maintain electroneutrality of the electrode active material. The stoichiometric values of one or more elements of the composition may take on non-integer values.

For all embodiments described herein, A is selected from the group consisting of elements from Group I of the Periodic Table, and mixtures thereof (e.g. $A_a = A_{a-a'}A'_{a'}$, wherein A and A' are each selected from the group consisting of elements from Group I of the Periodic Table and are different from one another, and a'<a). As referred to herein, "Group" refers to the Group numbers (i.e., columns) of the Periodic Table as defined in the current IUPAC Periodic Table. (See, e.g., U.S. Pat. No. 6,136,472, Barker et al., issued Oct. 24, 2000, incorporated by reference herein.) In addition, the recitation of a genus of elements, materials or other components, from which an individual component or mixture of components can be selected, is intended to include all possible sub-generic combinations of the listed components, and mixtures thereof.

In one embodiment, A is selected from the group consisting of Li (Lithium), Na (Sodium), K (Potassium), and mixtures thereof. A may be mixture of Li with Na, a mixture of Li with K, or a mixture of Li, Na and K. In another embodiment, A is Na, or a mixture of Na with K. In one preferred embodiment, A is Li.

A sufficient quantity (a) of moiety A should be present so as to allow all of the "redox active" elements of the moiety M (as defined herein below) to undergo oxidation/reduction. In one embodiment, $0 < a \leq 9$. In another embodiment, $0 < a \leq 2$. Unless otherwise specified, a variable described herein algebraically as equal to ("="), less than or equal to ("$\leq$"), or greater than or equal to ("$\geq$") a number is intended to subsume values or ranges of values about equal or functionally equivalent to said number.

Removal of an amount of A from the electrode active material is accompanied by a change in oxidation state of at least one of the "redox active" elements in the active material, as defined herein below. The amount of redox active material available for oxidation/reduction in the active material determines the amount (a) of the moiety A that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

In general, the amount (a) of moiety A in the active material varies during charge/discharge. Where the active materials of the present invention are synthesized for use in preparing an alkali metal-ion battery in a discharged state, such active materials are characterized by a relatively high value of "a", with a correspondingly low oxidation state of the redox active components of the active material. As the electrochemical cell is charged from its initial uncharged state, an amount (b) of moiety A is removed from the active material as described above. The resulting structure, containing less amount of the moiety A (i.e., a-b) than in the as-prepared state, and at least one of the redox active components having a higher oxidation state than in the as-prepared state, while essentially maintaining the original values of the remaining components (e.g. D, M, X, Y and Z). The active materials of this invention include such materials in their nascent state (i.e., as manufactured prior to inclusion in an electrode) and materials formed during operation of the battery (i.e., by insertion or removal of A).

For all embodiments described herein, D is at least one element having an atomic radius substantially comparable to that of the moiety being substituted (e.g. moiety M and/or moiety A). In one embodiment, D is at least one transition metal. Examples of transition metals useful herein with respect to moiety D include, without limitation, Nb (Niobium), Zr (Zirconium), Ti (Titanium), Ta (Tantalum), Mo (Molybdenum), W (Tungsten), and mixtures thereof. In another embodiment, moiety D is at least one element characterized as having a valence state of $\geq 2+$ and an atomic radius that is substantially comparable to that of the moiety being substituted (e.g. M and/or A). With respect to moiety A, examples of such elements include, without limitation, Nb (Niobium), Mg (Magnesium) and Zr (Zirconium). Preferably, the valence or oxidation state of D ($V^D$) is greater than the valence or oxidation state of the moiety (or sum of oxidation states of the elements consisting of the moiety) being substituted for by moiety D (e.g. moiety M and/or moiety A).

While not wishing to be held to any one theory, with respect to moiety A, it is thought that by incorporating a dopant (D) into the crystal structure of the active material of the present invention, wherein the amount (a) of moiety A initially present in the active material is substituted by an amount of D, the dopant will occupy sites in the active material normally occupied by A, thus substantially increasing the ionic and electrical conductivity of the active material. Such materials additionally exhibit enhanced electrical conductivity, thus reducing or eliminating the need for electrically conductive material (e.g. carbon) in the electrode. Reduction or elimination of carbonaceous materials in secondary electrochemical cells, including those disclosed herein, is desirable because of the long-term deleterious effects carbonaceous materials produce during the operation of the electrochemical cells (e.g. promotion of gas production within the electrochemical cell). Reduction or elimination of the carbonaceous material also permits insertion of a greater amount of active material, thereby increasing the electrochemical cell's capacity and energy density.

Moiety A may be partially substituted by moiety D by aliovalent or isocharge substitution, in equal or unequal stoichiometric amounts. "Isocharge substitution" refers to a substitution of one element on a given crystallographic site with an element having the same oxidation state (e.g. substitution of $Ca^{2+}$ with $Mg^{2+}$). "Aliovalent substitution" refers to a substitution of one element on a given crystallographic site with an element of a different oxidation state (e.g. substitution of $Li^+$ with $Mg^{2+}$).

For all embodiments described herein where moiety A is partially substituted by moiety D by isocharge substitution, A may be substituted by an equal stoichiometric amount of moiety D, whereby the active material of the present invention is represented by the nominal general formula (II):

$$[A_{a-f}D_d]M_m(XY_4)_pZ_e, \quad (II)$$

wherein f=d.

Where moiety A of general formula (II) is partially substituted by moiety D by isocharge substitution and d≠f, then the stoichiometric amount of one or more of the other components (e.g. A, M, $XY_4$ and Z) in the active material must be adjusted in order to maintain electroneutrality.

For all embodiments described herein where moiety A is partially substituted by moiety D by aliovalent substitution, moiety A may be substituted by an "oxidatively" equivalent amount of moiety D, whereby the active material of the present invention is represented by the nominal general formula (III):

$$\left[A_{a-\frac{f}{V^A}}, D_{\frac{d}{V^D}}\right]M_m(XY_4)_pZ_e, \quad (III)$$

wherein f=d, $V^A$ is the oxidation state of moiety A (or sum of oxidation states of the elements consisting of the moiety A), and $V^D$ is the oxidation state of moiety D.

Where moiety A of general formula (III) is partially substituted by moiety D by aliovalent substitution and d≠f, then the stoichiometric amount of one or more of the other components (e.g. A, M, $XY_4$ and Z) in the active material must be adjusted in order to maintain electroneutrality.

In one embodiment, moiety M is partially substituted by moiety D by aliovalent or isocharge substitution, in equal or unequal stoichiometric amounts. In this embodiment, d≥0, wherein moiety A may be substituted by moiety D by aliovalent or isocharge substitution, in equal or unequal stoichiometric amounts. Where moieties M and A are both partially substituted by moiety D, the elements selected for substitution for each moiety may be the same or different from one another.

For all embodiments described herein where moiety M is partially substituted by moiety D by isocharge substitution, M may be substituted by an equal stoichiometric amount of moiety D, whereby $M=[M_{m-u},D_v]$, wherein u=v. Where moiety M is partially substituted by moiety D by isocharge substitution and u≠v, then the stoichiometric amount of one or more of the other components (e.g. A, M, $XY_4$ and Z) in the active material must be adjusted in order to maintain electroneutrality.

For all embodiments described herein where moiety M is partially substituted by moiety D by aliovalent substitution, moiety M may be substituted by an "oxidatively" equivalent amount of moiety D, whereby $$\left[M_{m-\frac{u}{V^M}}, D_{\frac{v}{V^D}}\right],$$

wherein u=v, $V^M$ is the oxidation state of moiety M (or sum of oxidation states of the elements consisting of the moiety M), and $V^D$ is the oxidation state of moiety D.

Where moiety M is partially substituted by moiety D by aliovalent substitution and u≠v, then the stoichiometric amount of one or more of the other components (e.g. A, M, $XY_4$ and Z) in the active material must be adjusted in order to maintain electroneutrality.

In this embodiment, moiety M and (optionally) moiety A are each partially substituted by aliovalent or isocharge substitution. While not wishing to be held to any one theory, it is thought that by incorporating a dopant (D) into the crystal structure of the active material of the present invention in this manner, wherein the stoichiometric values M and (optionally) A are dependent on (reduced by) the amount of dopant provided for each crystallographic site, that the dopant will occupy sites in the active material normally occupied by moiety M and (optionally) moiety A. First, where $V^D > V^A$, doping sites normally occupied by A increases the number of available or unoccupied sites for A, thus substantially increasing the ionic and electrical conductivity of the active material. Second, doping the M sites reduces the concentration of available redox active elements, thus ensuring some amount of A remains in the active material upon charge, thereby increasing the structural stability of the active material. Such materials additionally exhibit enhanced electrical conductivity, thus reducing or eliminating the need for electrically conductive material in the electrode.

In all embodiments described herein, moiety M is at least one redox active element. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell.

Redox active elements useful herein with respect to moiety M include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium), Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. Also, "include," and its variants, is intended to be non-limiting, such that recitation of items in a list is not to the exclusion of other like items that may also be useful in the materials, compositions, devices, and methods of this invention.

In one embodiment, moiety M is a redox active element. In one subembodiment, M is a redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$. In another subembodiment, M is a redox active element selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, and $Nb^{3+}$.

In another embodiment, moiety M is a mixture of redox active elements or a mixture of at least one redox active element and at least one non-redox active element. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

In one embodiment, $M = MI_n MII_o$, wherein $0 < o+n \leq 3$ and each of o and n is greater than zero (0<o, n), wherein MI and MII are each independently selected from the group consisting of redox active elements and non-redox active elements, wherein at least one of MI and MII is redox active. MI may be partially substituted with MII by isocharge or aliovalent substitution, in equal or unequal stoichiometric amounts.

For all embodiments described herein where MI is partially substituted by MII by isocharge substitution, MI may be substituted by an equal stoichiometric amount of MII, whereby $M=MI_{n-o}MII_o$. Where MI is partially substituted by MII by isocharge substitution and the stoichiometric amount of MI is not equal to the amount of MII, whereby $M=MI_{n-o}MII_p$ and $o \neq p$, then the stoichiometric amount of one or more of the other components (e.g. A, D, $XY_4$ and Z) in the active material must be adjusted in order to maintain electroneutrality.

For all embodiments described herein where MI is partially substituted by MII by aliovalent substitution and an equal amount of MI is substituted by an equal amount of MII, whereby $M=MI_{n-o}MII_o$, then the stoichiometric amount of one or more of the other components (e.g. A, D, $XY_4$ and Z) in the active material must be adjusted in order to maintain electroneutrality. However, MI may be partially substituted by MII by aliovalent substitution by substituting an "oxidatively" equivalent amount of MII for MI, whereby $$M = MI_{n-\frac{o}{V^{MI}}} MII_{\frac{o}{V^{MII}}},$$

wherein $V^{MI}$ is the oxidation state of MI, and $V^{MII}$ is the oxidation state of MII.

In one subembodiment, MI is selected from the group consisting of Ti, V, Cr, Mn, Fe, Co, Ni, Cu, Mo, Si, Pb, Mo, Nb, and mixtures thereof, and MII is selected from the group consisting of Be, Mg, Ca, Sr, Ba, Sc, Y, Zn, Cd, B, Al, Ga, In, C, Ge, and mixtures thereof. In this subembodiment, MI may be substituted by MII by isocharge substitution or aliovalent substitution.

In another subembodiment, MI is partially substituted by MII by isocharge substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is selected from the group specified immediately above, and MII is selected from the group consisting of $Be^{2+}$, $Mg^{2+}$, $Ca^{2+}$, $Sr^{2+}$, $Ba^{2+}$, and mixtures thereof. In another aspect of this subembodiment, MI is selected from the group specified above, and MII is selected from the group consisting of $Zn^{2+}$, $Cd^{2+}$, and mixtures thereof. In yet another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof.

In another embodiment, MI is partially substituted by MII by aliovalent substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof. In another aspect of this subembodiment, MI is a 2+ oxidation state redox active element selected from the group specified immediately above, and MII is selected from the group consisting of alkali metals, $Cu^{1+}$, $Ag^{1+}$ and mixtures thereof. In another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is a 3+ oxidation state redox active element selected from the group specified immediately above, and MII is selected from the group consisting of alkali metals, $Cu^{1+}$, $Ag^{1+}$ and mixtures thereof.

In another embodiment, $M=M1_qM2_rM3_s$, wherein:

(a) M1 is a redox active element with a 2+ oxidation state;

(b) M2 is selected from the group consisting of redox and non-redox active elements with a 1+ oxidation state;

(c) M3 is selected from the group consisting of redox and non-redox active elements with a 3+ oxidation state; and (d) at least one of p, q and r is greater than 0, and at least one of M1, M2, and M3 is redox active.

In one subembodiment, M1 is substituted by an equal amount of M2 and/or M3, whereby q=q−(r+s). In this subembodiment, then the stoichiometric amount of one or more of the other components (e.g. A, $XY_4$, Z) in the active material must be adjusted in order to maintain electroneutrality.

In another subembodiment, $M^1$ is substituted by an "oxidatively" equivalent amount of $M^2$ and/or $M^3$, whereby $$M = M1_{q-\frac{r}{V^{M1}}-\frac{s}{V^{M1}}} M2_{\frac{r}{V^{M2}}} M3_{\frac{s}{V^{M3}}},$$

wherein $V^{M1}$ is the oxidation state of M1, $V^{M2}$ is the oxidation state of M2, and $V^{M3}$ is the oxidation state of M3.

In one subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $R^{1+}$, $Cs^{1+}$, and mixtures thereof.

In another subembodiment, M1 is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $R^{1+}$, $Cs^{1+}$, and mixtures thereof.

In another subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$, and mixtures thereof; and M3 is selected from the group consisting of $Sc^{3+}$, $Y^{3+}$, $B^{3+}$, $Al^{3+}$, $Ga^{3+}$, $In^{3+}$, and mixtures thereof. In another subembodiment, M1 and M3 are selected from their respective preceding groups, and M2 is selected from the group consisting of $Li^{1+}$, $K^{1+}$, $Na^{1+}$, $R^{1+}$, $Cs^{1+}$, and mixtures thereof.

In all embodiments described herein, moiety $XY_4$ is a polyanion selected from the group consisting of $X'[O_{4-x},Y'_x]$, $X'[O_{4-y},Y'_{2y}]$, $X''S_4$, $[X''',X'_{1-z}]O_4$, and mixtures thereof, wherein:

(a) X' and X''' are each independently selected from the group consisting of P, As, Sb, Si, Ge, V, S, and mixtures thereof;

(b) X'' is selected from the group consisting of P, As, Sb, Si, Ge, V, and mixtures thereof;

(c) Y' is selected from the group consisting of a halogen, S, N, and mixtures thereof; and (d) 0≦x≦3, 0≦y≦2, and 0≦z≦1.

In one embodiment, 1≦p≦3. In one subembodiment, p=1. In another subembodiment, p=3.

In one embodiment, $XY_4$ is selected from the group consisting of $X'O_{4-x}Y'_x$, $X'O_{4-y}Y'_{2y}$, and mixtures thereof, and x and y are both 0, Stated otherwise, $XY_4$ is a polyanion selected from the group consisting of $PO_4$, $SiO_4$, $GeO_4$, $VO_4$, $AsO_4$, $SbO_4$, $SO_4$, and mixtures thereof. Preferably, $XY_4$ is $PO_4$ (a phosphate group) or a mixture of $PO_4$ with another anion of the above-noted group (i.e., where X' is not P, Y' is not 0, or both, as defined above). In one embodiment, $XY_4$ includes about 80% or more phosphate and up to about 20% of one or more of the above-noted anions.

In another embodiment, $XY_4$ is selected from the group consisting of $X'[O_{4-x},Y'_x]$, $X'[O_{4-y},Y'_{2y}]$, and mixtures thereof, and 0<x≦3 and 0<y≦2, wherein a portion of the oxygen (O) in the $XY_4$ moiety is substituted with a halogen, S, N, or a mixture thereof.

In all embodiments described herein, moiety Z (when provided) is selected from the group consisting of OH (Hydroxyl), a halogen, or mixtures thereof. In one embodiment, Z is selected from the group consisting of OH, F (Fluorine), Cl (Chlorine), Br (Bromine), and mixtures thereof. In another embodiment, Z is OH. In another embodiment, Z is F, or a mixture of F with OH, Cl, or Br. Where the moiety Z is incorporated into the active material of the present invention, the active material may not take on a NASICON or olivine structural where p=3 or d=1, respectively. It is quite normal for the symmetry to be reduced with incorporation of, for example, halogens.

The composition of the electrode active material, as well as the stoichiometric values of the elements of the composition, are selected so as to maintain electroneutrality of the electrode active material. The stoichiometric values of one or more elements of the composition may take on non-integer values. Preferably, the $XY_4$ moiety is, as a unit moiety, an anion having a charge of −2, −3, or −4, depending on the selection of X', X'', X'''Y', and x and y. When $XY_4$ is a mixture of polyanions such as the preferred phosphate/phosphate substitutes discussed above, the net charge on the $XY_4$ anion may take on non-integer values, depending on the charge and composition of the individual groups $XY_4$ in the mixture.

In one particular embodiment, the electrode active material has an orthorhombic-dipyramidal crystal structure and belongs to the space group Pbnm (e.g. an olivine or triphylite material), and is represented by the nominal general formula (IV):

$$[A_a,D_d]M_mXY_4Z_e, \quad (IV)$$

wherein:

(a) the moieties A, D, M, X, Y and Z are as defined herein above;

(b) 0<a≦2, 0<d≦1; 1<m≦2, and 0<d≦1; and (c) the components of the moieties A, D, M, X, Y, and Z, as well as the values for a, d, m and e, are selected so as to maintain electroneutrality of the compound.

In one particular subembodiment, A of general formula (IV) is Li, 0.5<a≦1.5, $M=MI_{n-p}MII_o$, wherein o=p, 0.5<n≦1.5, 0<o≦0.1, MI is a 2+ oxidation state redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$ (preferably $Fe^{2+}$), MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof (preferably $Mg^{2+}$ or $Ca^{2+}$), $XY_4=PO_4$, and e=0.

In another particular embodiment, the electrode active material has a rhombohedral (space group R-3) or monoclinic (space group Pbcn) NASICON structure, and is represented by the nominal general formula (V):

$$[A_a,D_d]M_m(XY_4)_3Z_e, \quad (V)$$

wherein:

(a) the moieties A, D, M, X, Y and Z are as defined herein above;

(b) $0 < a \leq 5$, $0 < d \leq 1$; $1 < m \leq 3$, and $0 < e \leq 4$; and (c) the components of the moieties A, D, M, X, Y, and Z, as well as the values for a, d, m and e, are selected so as to maintain electroneutrality of the compound.

In one particular subembodiment, A of general formula (V) is Li, M is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof (preferably $V^{3+}$), $XY_4 = PO_4$, and $e = 0$.

Methods of Manufacture:

The particular starting materials employed will depend on the particular active material to be synthesized, reaction method employed, and desired by-products. The compound of the present invention is synthesized by reacting at least one A-containing compound, at least one D-containing compound, one or more M-containing compounds, at least one $XY_4$-supplying or containing compound, and (optionally) one or more Z-containing compounds, at a temperature and for a time sufficient to form the desired reaction product. As used herein, the term "supplying" includes compounds which contain the particular component, or reacts to form the particular component so specified.

Sources of the moiety A include any of a number of Group I metal-containing salts or ionic compounds. Lithium, sodium, and potassium compounds are preferred, with lithium being particularly preferred. Examples include, without limitation, alkali metal-containing fluorides, chlorides, bromides, iodides, nitrates, nitrites, sulfates, hydrogen sulfates, sulfites, bisulfites, carbonates, bicarbonates, borates, phosphates, silicates, antimonates, arsenates, germinates, oxides, acetates, oxalates, and the like. Hydrates of the above compounds may also be used, as well as mixtures thereof. The mixtures may contain more than one alkali metal so that a mixed alkali metal active material will be produced in the reaction.

Sources of the moieties M and D include, without limitation, M/D-containing fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, and oxalates of the same. Hydrates may also be used. The moiety M in the starting material may have any oxidation state, depending on the oxidation state required in the desired product and the oxidizing or reducing conditions contemplated, if any. It should be noted that many of the above-noted compounds may also function as a source of the $XY_4$ moiety.

The active materials described herein can contain one or more $XY_4$ moieties, or can contain a phosphate group that is completely or partially substituted by a number of other $XY_4$ moieties, which will also be referred to as "phosphate replacements" or "modified phosphates." Thus, active materials are provided according to the invention wherein the $XY_4$ moiety is a phosphate group that is completely or partially replaced by such moieties as sulfate $(SO_4)^{2-}$, monofluoromonophosphate, $(PO_3F)^{2-}$, difluoromonophosphate $(PO_2F)^{2-}$, silicate $(SiO_4)^{4-}$, arsenate, antimonate, vanadate, titanate, and germanate. Analogues of the above oxygenate anions where some or all of the oxygen is replaced by sulfur are also useful in the active materials of the invention, with the exception that the sulfate group may not be completely substituted with sulfur. For example, thiomonophosphates may also be used as a complete or partial replacement for phosphate in the active materials of the invention. Such thiomonophosphates include the anions $(PO_3S)^{3-}$, $(PO_2S_2)^{3-}$, $(POS_3)^{3-}$, and $(PS_4)^{3-}$, and are most conveniently available as the sodium, lithium, or potassium derivative. Non-limiting examples of sources of monofluoromonophosphates include, without limitation, $Na_2PO_3F$, $K_2PO_3F$, $(NH_4)_2PO_3F \cdot H_2O$, $LiNaPO_3F \cdot H_2O$, $LiKPO_3F$, $LiNH_4PO_3F$, $NaNH_4PO_3F$, $NaK_3(PO_3F)_2$ and $CaPO_3F \cdot 2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

Sources for the $XY_4$ moiety are common and readily available. For example, where X is Si, useful sources of silicon include orthosilicates, pyrosilicates, cyclic silicate anions such as $(Si_3O_9)^{6-}$, $(Si_6O_{18})^{12-}$ and the like, and pyrocenes represented by the formula $[(SiO_3)^{2-}]_n$, for example $LiAl(SiO_3)_2$. Silica or $SiO_2$ may also be used. Representative arsenate compounds that may be used to prepare the active materials of the invention, wherein X is As, include $H_3AsO_4$ and salts of the anions $[H_2AsO_4]^-$ and $[HAsO_4]^{2-}$. Where X is Sb, antimonate can be provided by antimony-containing materials such as $Sb_2O_5$, $M^I SbO_3$ where $M^I$ is a metal having oxidation state 1+, $M^{III} SbO_4$ where $M^{III}$ is a metal having an oxidation state of 3+, and $M^{II} Sb_2O_7$ where $M^{II}$ is a metal having an oxidation state of 2+. Additional sources of antimonate include compounds such as $Li_3SbO_4$, $NH_4H_2SbO_4$, and other alkali metal and/or ammonium mixed salts of the $[SbO_4]^{3-}$ anion. Where X is S, sulfate compounds that can be used to synthesize the active material include alkali metal and transition metal sulfates and bisulfates as well as mixed metal sulfates such as $(NH_4)_2Fe(SO_4)_2$, $NH_4Fe(SO_4)_2$ and the like. Finally, where X is Ge, a germanium containing compound such as $GeO_2$ may be used to synthesize the active material.

Where Y' of the $X'O_{4-x}Y'_x$ and $X'O_{4-y}Y'_{2y}$ moieties is F, sources of F include ionic compounds containing fluoride ion ($F^-$) or hydrogen difluoride ion ($HF_2^-$). The cation may be any cation that forms a stable compound with the fluoride or hydrogen difluoride anion. Examples include 1+, 2+ and 3+ metal cations, as well as ammonium and other nitrogen-containing cations. Ammonium is a preferred cation because it tends to form volatile by-products that are readily removed from the reaction mixture. Similarly, to make $X'O_{4-x}N_x$, starting materials are provided that contain "x" moles of a source of nitride ion. Sources of nitride are among those known in the art including nitride salts such as $Li_3N$ and $(NH_4)_3N$.

As noted above, the active materials of the present invention contain a mixture of A, D, M, $XY_4$, and (optionally) Z. A starting material may provide more than one these components, as is evident in the list above. In various embodiments of the invention, starting materials are provided that combine, for example, M and $PO_4$, thus requiring only the alkali metal and D to be added. In one embodiment, a starting material is provided that contains A, M and $PO_4$. As a general rule, there is sufficient flexibility to allow selection of starting materials containing any of the components of alkali metal A, D, M, $XY_4$, and (optionally) Z, depending on availability. Combinations of starting materials providing each of the components may also be used.

In general, any counterion may be combined with A, D, M, $XY_4$, and Z. It is preferred, however, to select starting materials with counterions that give rise to the formation of volatile by-products during the reaction. Thus, it is desirable to choose ammonium salts, carbonates, bicarbonates, oxides, hydroxides, and the like, where possible. Starting materials with these counterions tend to form volatile by-products such as water, ammonia, and carbon dioxide, which can be readily removed from the reaction mixture. Similarly, sulfur-containing anions such as sulfate, bisulfate, sulfite, bisulfite and the like tend to result in volatile sulfur oxide by-products. Nitrogen-containing anions such as nitrate and nitrite also tend to give volatile $NO_x$ by-products. This concept is well illustrated in the examples below.

Additionally, in some cases the performance of the active material may be dependent upon the amount of each reactant present in the reaction mixture. This is because the presence of certain unreacted starting materials in the active material may have a detrimental effect on the electrochemical performance of the active material. For example, with respect to the active material $Li_aMg_bFe_cPO_4$, synthesized via a solid state reaction of $LiH_2PO_4$ and $Fe_2O_3$ in the presence of a reducing agent (as defined herein below), it has been discovered that the presence of $Fe_2O_3$ in the reaction product has a deleterious effect on the electrochemical performance of the active material. Therefore, in this particular reaction, it is preferred that the $Fe_2O_3$ be the limiting reagent to ensure that substantially all of the $Fe_2O_3$ reacts. Preferably, for this particular reaction, it is preferred that the P to M ration (P:M) be approximately 1:0.95 to about 1:0.99. Furthermore, depending on the particular source of $LiH_2PO_4$, the Li:P ratio of $LiH_2PO_4$ may not be exactly 1:1 due to the presence of unreacted reactants used to synthesize $LiH_2PO_4$ (e.g. $H_3PO_4$). For example, if a $LiH_2PO_4$ material of 98% purity (e.g. containing 2% $H_3PO_4$) is employed, the Li:P ration in the reaction mixture is 0.98:1. Preferably, the overall Li:P:M ratio is from about 0.95:1:95 to about 0.99:1:0.99, and most preferably 0.98:1:0.96. Thus, as can be seen from the above-noted example, one with ordinary skill in the art would readily be able to optimize the electrochemical performance of the active material synthesized by choosing one of the reactant to be the limiting reagent, taking into account any impurities present in the reaction mixture, and comparing the electrochemical performance of the resulting active material to similar active materials wherein alternate reactants are chosen to be the limiting reagent.

One method for preparing the active materials of the present invention is via the hydrothermal treatment of the requisite starting materials. In a hydrothermal reaction, the starting materials are mixed with a small amount of a liquid (e.g. water), and heated in a pressurized vessel or bomb at a temperature that is relatively lower as compared to the temperature necessary to produce the active material in an oven at ambient pressure. Preferably, the reaction is carried out at a temperature of about 150° C. to about 450° C., under pressure, for a period of about 4 to about 48 hours, or until a reaction product forms.

A "sol-gel" preparation method may also be employed. Using this method, solute precursors with the required component are mixed in solution and then transformed into a solid via precipitation or gelation. The result wet powder or gel are dried at temperature in the range of about 100° C. to about 400° C. for short time and then, optionally, heated up to about 450° C. to about 700° C. in controlled atmosphere for about 1 hour to about 4 hours.

Another method for synthesizing the active materials of the present invention is via a thermite reaction, wherein M is reduced by a granular or powdered metal present in the reaction mixture.

The active materials of the present invention can also be synthesized via a solid state reaction, with or without simultaneous oxidation or reduction of those elements in the compound that are redox active, by heating the requisite starting materials at an elevated temperature for a given period of time, until the desired reaction product forms. In a solid-state reaction, the starting materials are provided in powder or particulate form, and are mixed together by any of a variety of procedures, such as by ball milling, blending in a mortar and pestle, and the like. Thereafter, the mixture of powdered starting materials may be compressed into a pellet and/or held together with a binder (which may also serve as a source of reducing agent) material to form a closely cohering reaction mixture. The reaction mixture is heated in an oven, generally at a temperature of about 400° C. or greater, until a reaction product forms.

The reaction may be carried out under reducing or oxidizing conditions, to reduce the oxidation state of M or to maintain the oxidation state of the M moiety. Reducing conditions may be provided by performing the reaction in a "reducing atmosphere" such as hydrogen, ammonia, carbon monoxide, methane, mixtures of thereof, or other suitable reducing gas. Reduction conditions may also be provided by conducting the reaction under low oxygen partial pressures. Alternatively or in addition thereto, the reduction may be carried out in situ by including in the reaction mixture a reductant that will participate in the reaction to reduce M, but that will produce by-products that will not interfere with the active material when used later in an electrode or an electrochemical cell.

In one embodiment, the reductant is elemental carbon, wherein the reducing power is provided by simultaneous oxidation of carbon to carbon monoxide and/or carbon dioxide. An excess of carbon, remaining after the reaction, is intimately mixed with the product active material and functions as a conductive constituent in the ultimate electrode formulation. Accordingly, excess carbon, on the order of 100% or greater, may be used. The presence of carbon particles in the starting materials also provides nucleation sites for the production of the product crystals.

The source of reducing carbon may also be provided by an organic material that forms a carbon-rich decomposition product, referred to herein as a "carbonaceous material," and other by-products upon heating under the conditions of the reaction. At least a portion of the organic precursor, carbonaceous material and/or by-products formed functions as a reductant during the synthesis reaction for the active material, before, during and/or after the organic precursor undergoes thermal decomposition. Such precursors include any liquid or solid organic material (e.g. sugars and other carbohydrates, including derivatives and polymers thereof, acetates and acrylates).

Although the reaction may be carried out in the presence of oxygen, the reaction is preferably conducted under an essentially non-oxidizing atmosphere so as not to interfere with the reduction reactions taking place. An essentially non-oxidizing atmosphere can be achieved through the use of vacuum, or through the use of inert gases such as argon and the like.

Preferably, the particulate starting materials are heated to a temperature below the melting point of the starting materials. The temperature should be about 400° C. or greater, and desirably about 450° C. or greater. CO and/or $CO_2$ evolve during the reaction. Higher temperatures favor CO formation. Some of the reactions are more desirably conducted at temperatures greater than about 600° C.; most desirably greater than about 650° C. Suitable ranges for many reactions are from about 500° C. to about 1200° C.

At about 700° C. both the C→CO and the C→$CO_2$ reactions are occurring. At closer to about 600° C. the C→$CO_2$ reaction is the dominant reaction. At closer to about 800° C. the C→CO reaction is dominant. Since the reducing effect of the C→$CO_2$ reaction is greater, the result is that less carbon is needed per atomic unit of metal to be reduced. CO produced during the C→CO reaction may be further involved in the reduction reaction via the CO→$CO_2$ reaction.

The starting materials may be heated at ramp rates from a fraction of a degree up to about 10° C. per minute. Once the desired reaction temperature is attained, the reactants (starting materials) are held at the reaction temperature for a time sufficient for the reaction to occur. Typically, the reaction is carried out for several hours at the final reaction temperature.

After reaction, the products are preferably cooled from the elevated temperature to ambient (room) temperature (i.e., about 10° C. to about 40° C.). It is also possible to quench the products to achieve a higher cooling rate, for example on the order of about 100° C./minute. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

Electrochemical Cells:

To form an electrode, the active material of the present invention may be combined with a polymeric binder in order to form a cohesive mixture. The mixture this then placed in electrical communication with a current collector which, in turn, provides electrical communication between the electrode and an external load. The mixture may be formed or laminated onto the current collector, or an electrode film may be formed from the mixture wherein the current collector is embedded in the film. Suitable current collectors include reticulated or foiled metals (e.g. aluminum, copper and the like). An electrically conductive agent (e.g. carbon and the like) may be added to the mixture so as to increase the electrical conductivity of the electrode. In one embodiment, the electrode material is pressed onto or about the current collector, thus eliminating the need for the polymeric binder.

To form an electrochemical cell, a solid electrolyte or an electrolyte-permeable separator is interposed between the electrode and a counter-electrode. In one embodiment, the counter-electrode contains an intercalation active material selected from the group consisting of a transition metal oxide, a metal chalcogenide, carbon (e.g. graphite), and mixtures thereof. Counter electrodes, electrolyte compositions, and methods for making the same, among those useful herein, are described in U.S. Ser. No. 10/323,457, filed Dec. 18, 2002; U.S. Pat. No. 5,700,298, Shi et al., issued Dec. 23, 1997; U.S. Pat. No. 5,830,602, Barker et al., issued Nov. 3, 1998; U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Electrochemical cells composed of electrodes, electrolytes and other materials, among those useful herein, are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001.

Synthesis and Characterization of Active Materials:

The following non-limiting examples illustrate the compositions and methods of the present invention.

Example 1

Reaction A

Synthesis of $Li_aNb_bMnPO_4$ $$LiH_2PO_4 + Mn(CH_3CO_2)_2 \cdot 4H_2O + Nb_2O_5 + NH_4H_2PO_4 \rightarrow Li_aNb_bMnPO_4 \quad \text{(A)}$$

$Li_aNb_bMnPO_4$ active material synthesized per reaction A is accomplished by first combining the reactants, and then ball milling the same to mix the particles. Thereafter, the particle mixture is pelletized. The pelletized mixture is heated for about 4 hours at about 700° C. in an oven in a flowing inert atmosphere (e.g. argon). Thereafter, the sample is cooled and then removed from the oven. To synthesize active material with no residual carbon (which is present due to the pyrolization of any organic material present in the reaction mixture), a high flow-rate inert atmosphere or partially oxidizing atmosphere is employed.

Several compounds having the general formula $Li_aNb_bMnPO_4$ were synthesized per reaction A. Because these compounds exhibited low electrical conductivity, electrochemical performance data could not be obtained experimentally. Table 1 below summarizes the reactants employed and their respective amounts for each compound synthesized. In each example herein below, the weight in grams of each reactant was adjusted to account for impurities present in the particular reactant.

TABLE 1

| Sample No. | $LiH_2PO_4$ 103.93 g/mol | $Mn(CH_3CO_2)_2 \cdot 4H_2O$ 245.09 g/mol | $Nb_2O_5$ 265.81 g/mol | $NH_4H_2PO_4$ 115.03 g/mol | $Li_aNb_bMnPO_4$ |
|---|---|---|---|---|---|
| 1 | 0.99 mol | 1 mol | 0.001 mol | 0.01 mol | a = 0.99, b = 0.002 |
| 2 | 0.98 mol | 1 mol | 0.002 mol | 0.02 mol | a = 0.98, b = 0.004 |
| 3 | 0.97 mol | 1 mol | 0.003 mol | 0.03 mol | a = 0.97, b = 0.006 |

TABLE 1-continued

| Sample No. | LiH$_2$PO$_4$ 103.93 g/mol | Mn(CH$_3$CO$_2$)$_2$.4H$_2$O 245.09 g/mol | Nb$_2$O$_5$ 265.81 g/mol | NH$_4$H$_2$PO$_4$ 115.03 g/mol | Li$_a$Nb$_b$MnPO$_4$ |
|---|---|---|---|---|---|
| 4 | 0.96 mol | 1 mol | 0.004 mol | 0.04 mol | a = 0.96<br>b = 0.008 |

Example 2

Reaction B

Synthesis of Li$_a$Mg$_b$Mn$_c$PO$_4$ $$\text{LiH}_2\text{PO}_4 + \text{Mn(CH}_3\text{CO}_2)_2 \cdot 4\text{H}_2\text{O} + \text{Mg(CH}_3\text{CO}_2)_2 \cdot 4\text{H}_2\text{O} + \text{NH}_4\text{H}_2\text{PO}_4 \rightarrow \text{Li}_a\text{Mg}_b\text{Mn}_c\text{PO}_4 \quad (B)$$

Several compounds having the general formula Li$_a$Mg$_b$Mn$_c$PO$_4$ were synthesized per reaction B, per the reaction conditions of Example 1. Because these compounds exhibited low electrical conductivity, electrochemical performance data could not be obtained experimentally. Table 2 below summarizes the reactants employed and their respective amounts for each compound synthesized.

TABLE 2

| Sample No. | LiH$_2$PO$_4$ 103.93 g/mol | Mn(CH$_3$CO$_2$)$_2$. 4H$_2$O 245.09 g/mol | Mg(CH$_3$CO$_2$)$_2$. 4H$_2$O 214.46 g/mol | NH$_4$H$_2$PO$_4$ 115.03 g/mol | Li$_a$Mg$_b$Mn$_c$PO$_4$ |
|---|---|---|---|---|---|
| 1 | 0.98 mol | 1 mol | 0.01 mol | 0.02 mol | a = 0.98<br>b = 0.01, c = 1 |
| 2 | 0.96 mol | 1 mol | 0.02 mol | 0.04 mol | a = 0.96<br>b = 0.02, c = 1 |
| 3 | 0.94 mol | 1 mol | 0.03 mol | 0.06 mol | a = 0.94<br>b = 0.03, c = 1 |
| 4 | 0.96 mol | 1 mol | 0.05 mol | 0.02 mol | a = 0.98, b = 0.05, c = 0.96 |

Example 3

Reaction C

Synthesis of Li$_a$Zr$_b$MnPO$_4$ $$\text{LiH}_2\text{PO}_4 + \text{Zr(OC}_2\text{H}_5)_4 + \text{Mn(CH}_3\text{CO}_2)_2 \cdot 4\text{H}_2\text{O} + \text{NH}_4\text{H}_2\text{PO}_4 \rightarrow \text{Li}_a\text{Zr}_b\text{MnPO}_4 \quad (C)$$

Several compounds having the general formula Li$_a$Zr$_b$MnPO$_4$ were synthesized per reaction C, per the reaction conditions of Example 1. Because these compounds exhibited low electrical conductivity, electrochemical performance data could not be obtained experimentally. Table 3 below summarizes the reactants employed and their respective amounts for each compound synthesized.

TABLE 3

| Sample No. | LiH$_2$PO$_4$ 103.93 g/mol | Zr(OC$_2$H$_5$)$_4$ 271.41 g/mol | Mn(CH$_3$CO$_2$)$_2$.4H$_2$O 245.09 g/mol | NH$_4$H$_2$PO$_4$ 115.03 g/mol | Li$_a$Zr$_b$MnPO$_4$ |
|---|---|---|---|---|---|
| 1 | 0.98 mol | 0.005 mol | 1 mol | 0.02 mol | a = 0.98<br>b = 0.005 |
| 2 | 0.96 mol | 0.01 mol | 1 mol | 0.04 mol | a = 0.96<br>b = 0.01 |

Example 4

Reaction D

Synthesis of Li$_a$Zr$_b$V$_2$(PO$_4$)$_3$ $$\text{LiH}_2\text{PO}_4 + \text{Zr(OC}_2\text{H}_5)_4 + \text{V}_2\text{O}_3 + \text{NH}_4\text{H}_2\text{PO}_4 \rightarrow \text{Li}_a\text{Zr}_b\text{V}_2(\text{PO}_4)_3 \quad (D)$$

Several compounds having the general formula Li$_a$Zr$_b$V$_2$(PO$_4$)$_3$ were synthesized per reaction D, per the reaction conditions of Example 1. Table 4 below summarizes the reactants employed and their respective amounts for each compound synthesized.

TABLE 4

| Sample No. | LiH$_2$PO$_4$ 103.93 g/mol | Zr(OC$_2$H$_5$)$_4$ 271.41 g/mol | V$_2$O$_3$ 149.88 g/mol | NH$_4$H$_2$PO$_4$ 115.03 g/mol | Li$_a$Zr$_b$V$_2$PO$_4$ |
|---|---|---|---|---|---|
| 1 | 2.98 mol | 0.005 mol | 1 mol | 0.02 mol | a = 2.98<br>b = 0.005 |
| 2 | 2.94 mol | 0.01 mol | 1 mol | 0.06 mol | a = 2.96<br>b = 0.01 |
| 3 | 2.9 mol | 0.025 mol | 1 mol | 0.1 mol | a = 2.90<br>b = 0.025 |
| 4 | 2.8 mol | 0.05 mol | 1 mol | 0.2 mol | a = 2.80<br>b = 0.05 |

Example 5

Reaction E

Synthesis of $Li_aNb_bV_2(PO_4)_3$ $$LiH_2PO_4 + Nb_2O_5 + V_2O_3 + NH_4H_2PO_4 \rightarrow Li_aNb_bV_2(PO_4)_3 \quad (E)$$

Several compounds having the general formula $Li_aNb_bV_2(PO_4)_3$ were synthesized per reaction E, per the reaction conditions of Example 1. Table 5 below summarizes the reactants employed and their respective amounts for each compound synthesized.

TABLE 5

| Sample No. | $LiH_2PO_4$ 103.93 g/mol | $Nb_2O_5$ 265.81 g/mol | $V_2O_3$ 149.88 g/mol | $NH_4H_2PO_4$ 115.03 g/mol | $Li_aNb_bV_2(PO_4)_3$ |
|---|---|---|---|---|---|
| 1 | 2.99 mol | 0.001 mol | 1 mol | 0.01 mol | a = 2.99, b = 0.002 |
| 2 | 2.98 mol | 0.002 mol | 1 mol | 0.02 mol | a = 2.98, b = 0.004 |
| 3 | 2.97 mol | 0.003 mol | 1 mol | 0.03 mol | a = 2.97, b = 0.006 |
| 4 | 2.96 mol | 0.004 mol | 1 mol | 0.04 mol | a = 2.96, b = 0.008 |
| 5 | 2.95 mol | 0.005 mol | 1 mol | 0.05 mol | a = 2.95, b = 0.01 |

Example 6

Reaction F

Synthesis of $Li_aMg_bV_2(PO_4)_3$ $$LiH_2PO_4 + Mg(CH_3CO_2)_2 \cdot 4H_2O + V_2O_3 + NH_4H_2PO_4 \rightarrow Li_aMg_bV_2(PO_4)_3 \quad (F)$$

Several compounds having the general formula $Li_aMg_bV_2(PO_4)_3$ were synthesized per reaction F, per the reaction conditions of Example 1. Table 6 below summarizes the reactants employed and their respective amounts for each compound synthesized.

TABLE 6

| Sample No. | $LiH_2PO_4$ 103.93 g/mol | $Mg(CH_3CO_2)_2 \cdot 4H_2O$ 214.46 g/mol | $V_2O_3$ 149.88 g/mol | $NH_4H_2PO_4$ 115.03 g/mol | $Li_aMg_bV_2(PO_4)_3$ |
|---|---|---|---|---|---|
| 1 | 2.98 mol | 0.01 mol | 1 mol | 0.02 mol | a = 2.98, b = 0.01 |
| 2 | 2.94 mol | 0.03 mol | 1 mol | 0.06 mol | a = 2.94, b = 0.03 |
| 3 | 2.9 mol | 0.05 mol | 1 mol | 0.1 mol | a = 2.90, b = 0.05 |
| 4 | 2.8 mol | 0.1 mol | 1 mol | 0.2 mol | a = 2.80, b = 0.1 |

Example 7

Reaction G

Synthesis and Characterization of $Li_aZr_bCoPO_4$ $$LiH_2PO_4 + Zr(OC_2H_5)_4 + CO_3O_4 + NH_4H_2PO_4 \rightarrow Li_aZr_bCoPO_4 \quad (G)$$

Several compounds having the general formula $Li_aZr_bCoPO_4$ were synthesized per reaction G, per the reaction conditions of Example 1. Table 7 below summarizes the reactants employed, and their respective amounts, for each compound synthesized.

TABLE 7

| Sample No. | $LiH_2PO_4$ 103.93 g/mol | $Zr(OC_2H_5)_4$ 271.41 g/mol | $Co_3O_4$ 240.80 g/mol | $NH_4H_2PO_4$ 115.03 g/mol | $Li_aZr_bCoPO_4$ |
|---|---|---|---|---|---|
| 1 | 1 mol | 0.00 mol | 0.33 mol | 0.00 mol | a = 1 |
| 2 | 0.98 mol | 0.005 mol | 0.33 mol | 0.02 mol | a = 0.98, b = 0.005 |
| 3 | 0.96 mol | 0.01 mol | 0.33 mol | 0.04 mol | a = 0.96, b = 0.01 |

Example 8

Reaction H

Synthesis of $Li_aNb_bCoPO_4$ $$LiH_2PO_4 + Nb_2O_5 + CO_3O_4 + NH_4H_2PO_4 \rightarrow Li_aNb_bCoPO_4 \quad (H)$$

Several compounds having the general formula $Li_aNb_bCoPO_4$ were synthesized per reaction H, per the reaction conditions of Example 1. Table 8 below summarizes the reactants employed, and their respective amounts, for each compound synthesized.

TABLE 8

| Sample No. | $LiH_2PO_4$ 103.93 g/mol | $Nb_2O_5$ 265.81 g/mol | $Co_3O_4$ 240.80 g/mol | $NH_4H_2PO_4$ 115.03 g/mol | $Li_aNb_bCoPO_4$ |
|---|---|---|---|---|---|
| 1 | 0.99 mol | 0.001 mol | 0.33 mol | 0.01 mol | a = 0.99, b = 0.002 |
| 2 | 0.98 mol | 0.002 mol | 0.33 mol | 0.02 mol | a = 0.98, b = 0.004 |
| 3 | 0.97 mol | 0.003 mol | 0.33 mol | 0.03 mol | a = 0.97, b = 0.006 |
| 4 | 0.96 mol | 0.004 mol | 0.32 mol | 0.04 mol | a = 0.96, b = 0.008 |

Example 9

Reaction I

Synthesis and Characterization of $Li_aMg_bCo_cPO_4$

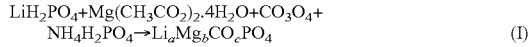

Several compounds having the general formula $Li_aMg_bCo_cPO_4$ were synthesized per reaction I, per the reaction conditions of Example 1. Table 9 below summarizes the reactants employed, and their respective amounts, for each compound synthesized.

TABLE 9

| Sample No. | $LiH_2PO_4$ 103.93 g/mol | $MgCH_3CO_2.4H_2O$ 214.46 g/mol | $Co_3O_4$ 240.80 g/mol | $NH_4H_2PO_4$ 115.03 g/mol | $Li_aMg_bCo_cPO_4$ |
|---|---|---|---|---|---|
| 1 | 0.98 mol | 0.01 mol | 0.33 mol | 0.02 mol | a = 0.98, b = 0.01, c = 1 |
| 2 | 0.96 mol | 0.02 mol | 0.33 mol | 0.04 mol | a = 0.96, b = 0.02, c = 1 |
| 3 | 0.94 mol | 0.03 mol | 0.33 mol | 0.06 mol | a = 0.94, b = 0.03, c = 1 |
| 4 | 0.98 mol | 0.05 mol | 0.33 mol | 0.02 mol | a = 0.98, b = 0.05, c = 0.96 |

$Li_aMg_bCo_cPO_4$ active material synthesized as per Reaction I was black in color, and the measured electrical conductivity ranged from about $10^{-4}$ S/cm to about $10^{-3}$ S/cm. $LiCoPO_4$ active material was bright purple in color, and the electrical conductivity ranged from about $10^{-9}$ S/cm to about $10^{-10}$ S/cm.

Example 10

Reaction J

Synthesis and Characterization of $Li_aZr_bFePO_4$

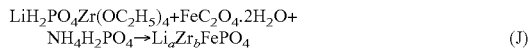

Several compounds having the general formula $Li_aZr_bFePO_4$ were synthesized per reaction J, per the reaction conditions of Example 1. Table 10 below summarizes the reactants employed, and their respective amounts, for each compound synthesized.

TABLE 10

| Sample No. | $LiH_2PO_4$ 103.93 g/mol | $Zr(OC_2H_5)_4$ 271.41 g/mol | $FeC_2O_4.2H_2O$ 179.90 g/mol | $NH_4H_2PO_4$ 115.03 g/mol | $Li_aZr_bFePO_4$ |
|---|---|---|---|---|---|
| 1 | 0.98 mol | 0.005 mol | 1 mol | 0.02 mol | a = 0.98, b = 0.005 |
| 2 | 0.96 mol | 0.01 mol | 1 mol | 0.04 mol | a = 0.96, b = 0.01 |

Example 11

Reaction K

Synthesis and Characterization of $Li_aNb_bFePO_4$

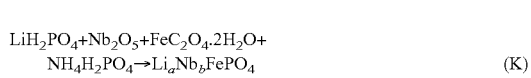

Several compounds having the general formula $Li_aNb_bFePO_4$ were synthesized per reaction K, per the reaction conditions of Example 1. Table 11 below summarizes the reactants employed, and their respective amounts, for each compound synthesized.

TABLE 11

| Sample No. | $LiH_2PO_4$ 103.93 g/mol | $Nb_2O_5$ 265.81 g/mol | $FeC_2O_4.2H_2O$ 179.90 g/mol | $NH_4H_2PO_4$ 115.03 g/mol | $Li_aNb_bFePO_4$ |
|---|---|---|---|---|---|
| 1 | 0.99 mol | 0.001 mol | 1 mol | 0.01 mol | a = 0.99, b = 0.002 |
| 2 | 0.98 mol | 0.002 mol | 1 mol | 0.02 mol | a = 0.98, b = 0.004 |
| 3 | 0.97 mol | 0.003 mol | 1 mol | 0.03 mol | a = 0.97, b = 0.006 |
| 4 | 0.96 mol | 0.004 mol | 1 mol | 0.04 mol | a = 0.96, b = 0.008 |

The weight percent wt % of residual carbon formed upon the decomposition of the Fe reactant complex, was determined to be about 1 to 2 weight percent wt % for all the samples 1, 2, 3 and 4.

The electrical conductivity for a sample of $Li_{0.95}Nb_{0.01}FePO_4$ and $Li_{0.99}Nb_{0.002}FePO_4$ synthesized as per reaction J was determined to be approximately $10^{-3}$ S/cm. The measurements were repeated for $LiFePO_4$ prepared per the teachings of Example 11 herein below, which yielded an electrical conductivity of approximately $10^{-10}$ S/cm.

Example 12

Reaction L

Synthesis and Characterization of $Li_aMg_bFe_cPO_4$

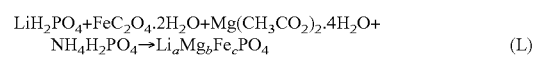

Several compounds having the general formula $Li_aMg_b\text{-}Fe_cPO_4$ were synthesized per reaction L, per the reaction conditions of Example 1. Table 12 below summarizes the reactants employed, and their respective amounts, for each compound synthesized.

TABLE 12

| Sample No. | $LiH_2PO_4$ 103.93 g/mol | $Mg(CH_3CO_2)_2 \cdot 4H_2O$ 214.46 g/mol | $FeC_2O_4 \cdot 2H_2O$ 179.90 g/mol | $NH_4H_2PO_4$ 115.03 g/mol | $Li_aMg_bFe_cPO_4$ |
|---|---|---|---|---|---|
| 1 | 1 mol | 0.00 mol | 1 mol | 0.00 mol | a = 1, b = 0, c = 1 |
| 2 | 0.98 mol | 0.01 mol | 1 mol | 0.02 mol | a = 0.98, b = 0.01, c = 1 |
| 3 | 1 mol | 0.04 mol | 1 mol | 0.00 mol | a = 1, b = 0.04, c = 0.96 |
| 4 | 0.98 mol | 0.05 mol | 1 mol | 0.02 mol | a = 0.98, b = 0.05, c = 0.96 |

$LiFePO_4$ active material synthesized as per Reaction L was green or light gray in color. In contrast, $Li_aMg_bFe_cPO_4$ active materials synthesized as per Reaction L were black in color.

Reitveld refined CuKα (λ=1.5405 Å with a scattering angle of 2θ) x-ray diffraction patterns were collected for the $LiFePO_4$, $Li_{0.98}Mg_{0.01}FePO_4$, and $Li_{0.98}Mg_{0.05}Fe_{0.96}PO_4$ active materials, and are represented in FIG. 1. The patterns shown in FIG. 1 for $Li_{0.98}Mg_{0.01}FePO_4$ and $Li_{0.98}Mg_{0.05}Fe_{0.96}PO_4$ show that these materials are single phase materials, as is $LiFePO_4$. Table 13 below shows the unit cell dimensions and volumes obtained for the three active materials.

TABLE 13

| Active Material | a (Å) | b (Å) | c (Å) | Volume (Å) |
|---|---|---|---|---|
| $LiFePO_4$ | 10.3245 | 6.0088 | 4.6958 | 291.3168 |
| $Li_{0.98}Mg_{0.01}FePO_4$ | 10.3158 | 6.0021 | 4.6932 | 290.5872 |
| $Li_{0.98}Mg_{0.05}Fe_{0.96}PO_4$ | 10.3099 | 5.9983 | 4.6920 | 290.1591 |

Electrochemical Performance of Active Material:

For several samples identified above, electrochemical cells were prepared as follows. To test the electrochemical performance of pure active material and eliminate the effect of carbon and binder, the as-synthesized powder (first passed through 53 micron screen) is wetted with a suitable volatile solvent (e.g. acetone), sprayed on Al disk and then pressed under 50,000 pounds per square inch (psi) pressure for 10 minutes. The active powder adheres to the Al current collector to form a stable disk cathode electrode. There are no carbon additives or polymeric binder in the disk cathode electrode.

In some of the examples herein below, in order to test the electrochemical performance of active materials in a regular cell configuration, the as-synthesized powder (first passed through 53 micron screen) is mixed with conductive carbon black (4 wt %) and poly(vinylidene difluoride) (PVdF) (10 wt %) solution in acetone, and cast onto an Al current collector to form stable film cathode electrode.

Lithium metal foil is employed as the anode. The electrolyte includes ethylene carbonate (EC) and ethyl methyl carbonate (EMC) in a weight ratio of 2:1, and a 1 molar concentration of $LiPF_6$ salt. A glass fiber separator interpenetrated by the solvent and the salt is interposed between the cathode and the anode. In each of the examples described herein, the electrochemical cell is cycled using constant current cycling at ±0.2 milliamps per square centimeter ($mA/cm^2$) in a range of 3 to 5 volts (V) at a temperature of about 23° C., at varying rates.

Figure 2:
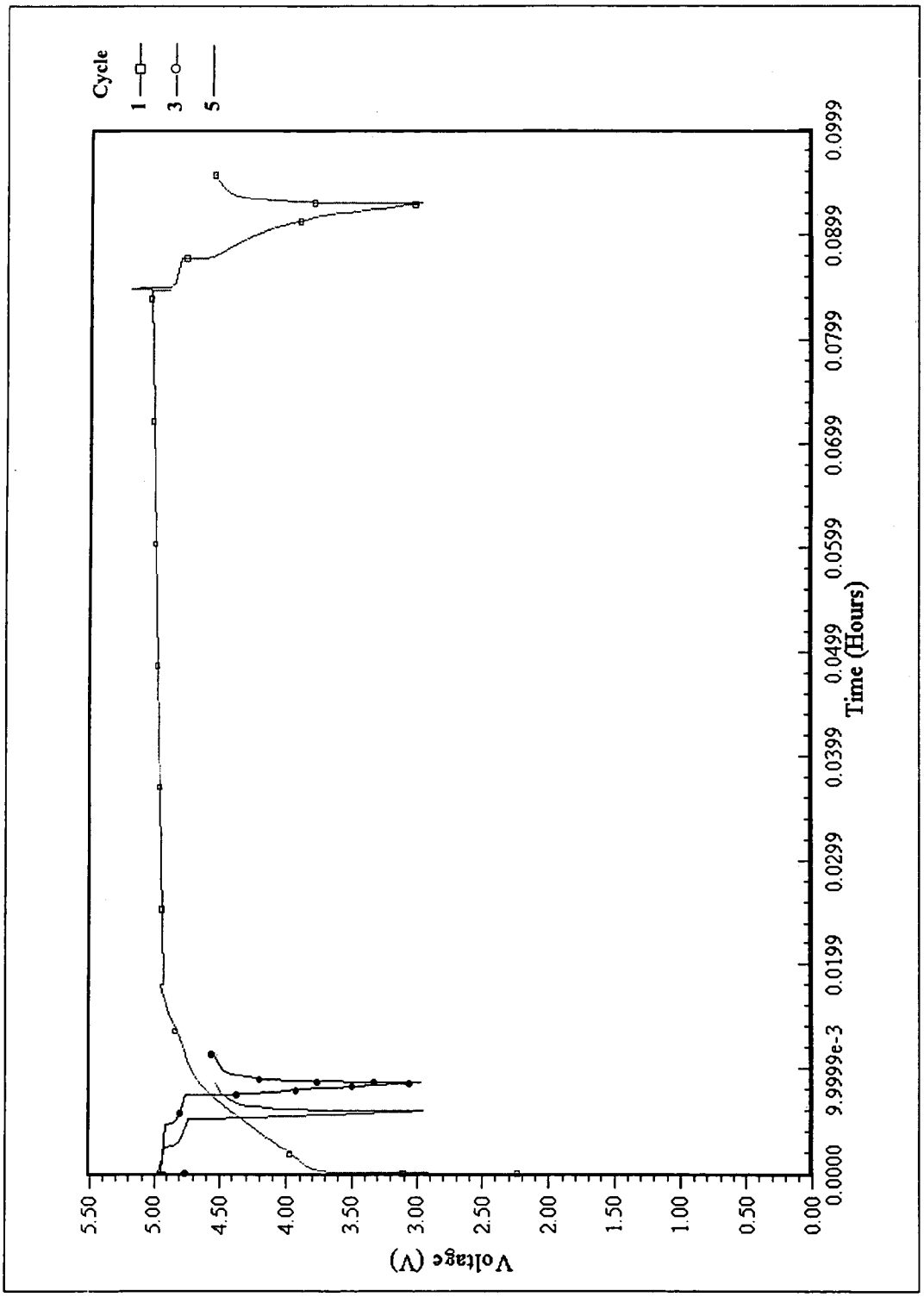
FIG. 2 is a voltage profile of the first, third and fifth discharge cycles for a $LiCoPO_4$-containing cathode (100% $LiCoPO_4$, 0% binder, 0% carbon) cycled with a lithium metal anode using constant current cycling at ±0.2 milliamps per square centimeter ($mA/cm^2$) in a range of 3.0 to 5 volts (V) at a temperature of about 23° C. The electrolyte includes ethylene carbonate (EC) and ethyl methyl carbonate (EMC) in a weight ratio of 2:1, and a 1 molar concentration of $LiPF_6$ salt. A glass fiber separator interpenetrated by the solvent and the salt is interposed between the cathode and the anode.
Figure 3:
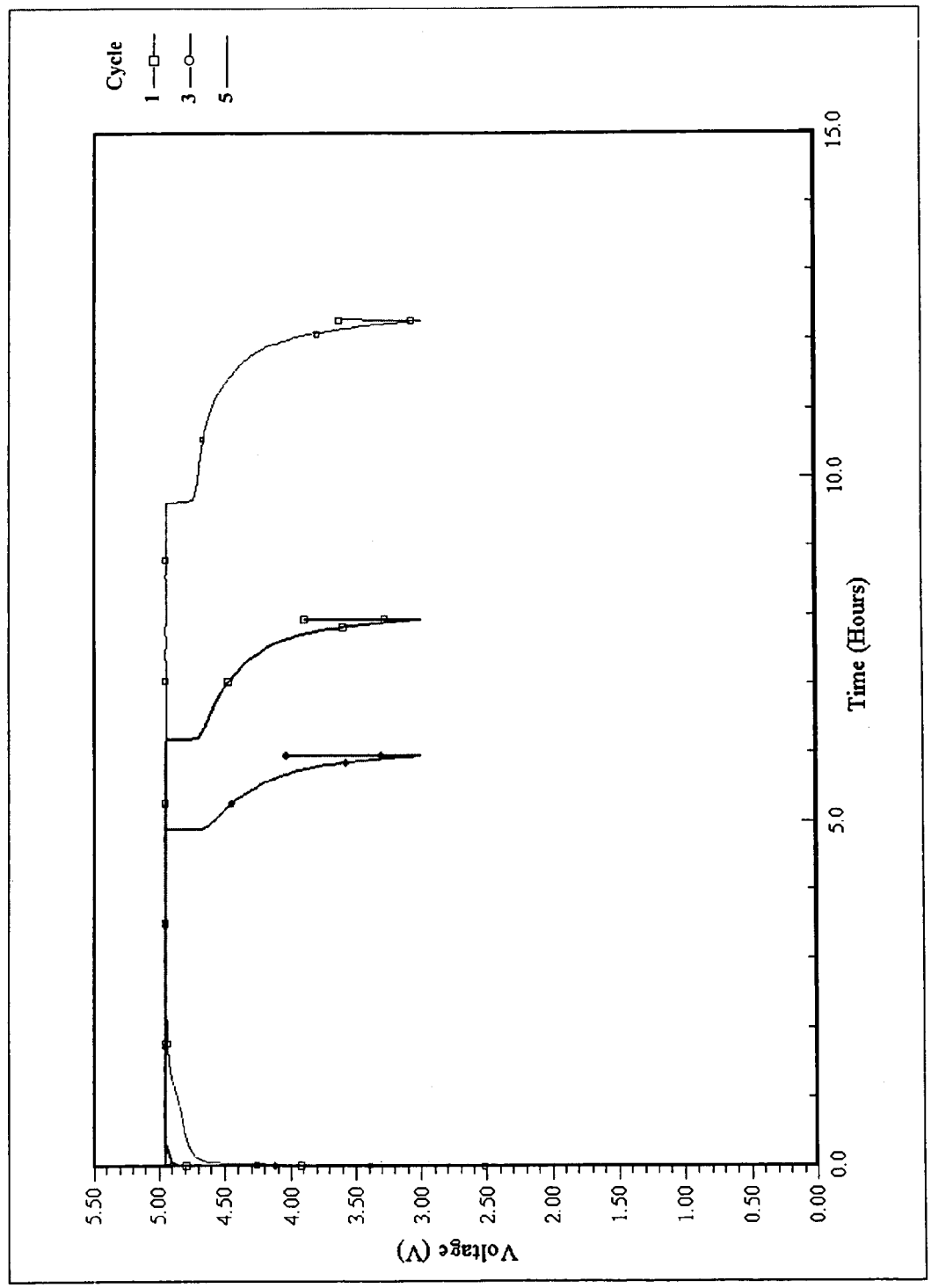
FIG. 3 is a voltage profile of the first, third and fifth discharge cycles for a $Li_{0.98}Mg_{0.05}Co_{0.96}PO_4$-containing cathode (100% $Li_{0.98}Mg_{0.05}Co_{0.96}PO_4$, 0% binder, 0% carbon) cycled in a cell using the test conditions described with respect to FIG. 2.

An electrochemical cell constructed using a disk cathode containing $LiCoPO_4$ synthesized per the teaching of Example 7 (0% binder, 0% carbon, 100% $LiCoPO_4$ synthesized in a high flow-rate inert atmosphere), was cycled per the conditions stated above. FIG. 2 is a voltage profile (voltage as a function of time) for the cell. As the profile in FIG. 2 indicates, the cell exhibited almost no capacity, which is attributed to the high electrical resistivity of the active material. An electrochemical cell constructed using a disk cathode containing $Li_{0.98}Mg_{0.05}Co_{0.96}PO_4$ (0% binder, 0% carbon) was cycled per the conditions stated above. FIG. 3 is a voltage profile for the cell. As the profile in FIG. 3, indicates, $LiCoPO_4$ doped with Mg exhibited a significantly greater amount of capacity than undoped $LiCoPO_4$, even in the absence of carbon. Table 14 below shows the charge capacity ($Q_c$) and discharge capacity ($Q_d$) for the active material contained in each electrochemical cell, as well as the corresponding capacity loss for each cycle.

TABLE 14

| Active Material and Theoretical Capacity | Cycle No. | $Q_c$ (mAh/g) | $Q_d$ (mAh/g) | Capacity Loss (%) |
|---|---|---|---|---|
| $LiCoPO_4$ 166.66 mAh/g | 1 | 1.250 | 0.162 | 87.1 |
|  | 2 | 0.125 | 0.074 | 40.5 |
|  | 3 | 0.055 | 0.040 | 27.9 |
|  | 4 | 0.043 | 0.030 | 30.7 |
|  | 5 | 0.031 | 0.022 | 29.4 |
| $Li_{0.98}Mg_{0.05}Co_{0.96}PO_4$ 161.3 mAh/g | 1 | 151.0 | 78.2 | 48.2 |
|  | 2 | 77.7 | 62.4 | 19.6 |
|  | 3 | 63.9 | 51.4 | 19.6 |
|  | 4 | 51.8 | 41.4 | 20.0 |
|  | 5 | 39.6 | 31.8 | 19.7 |

Figure 4:
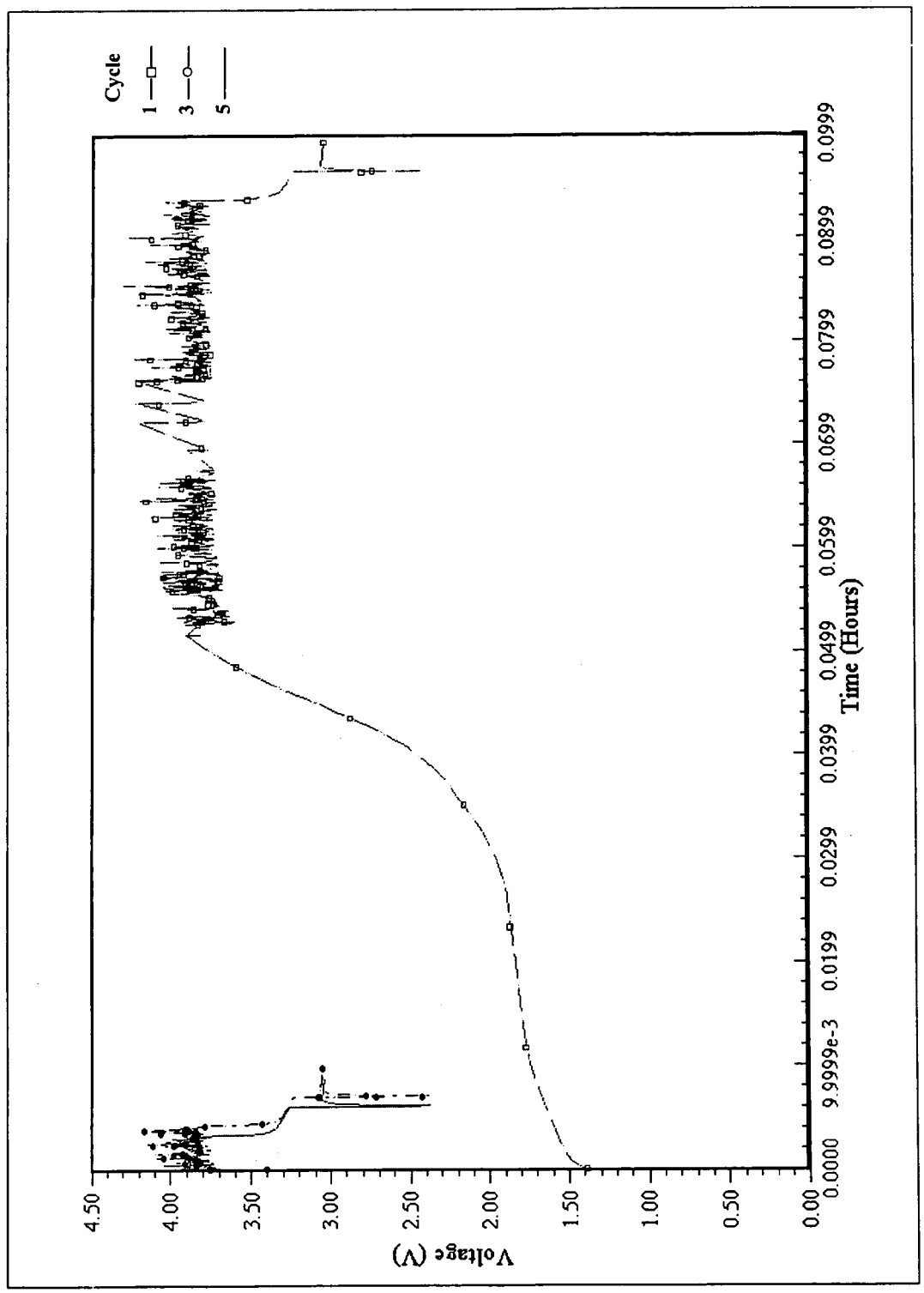
FIG. 4 is a voltage profile of the first, third and fifth discharge cycles for a $LiFePO_4$-containing cathode (100% $LiFePO_4$, 0% binder, 0% carbon) cycled in a cell using the test conditions described with respect to FIG. 2.

An electrochemical cell constructed using a disk cathode containing $LiFePO_4$ synthesized per the teaching of Example 12 using a high flow-rate inert atmosphere (0% binder, 0% carbon, 100% $LiFePO_4$), was cycled per the conditions stated above. FIG. 4 is a voltage profile (voltage as a function of time) for the cell. As the profile in FIG. 4 indicates, the cell exhibited almost no capacity, which is attributed to the high electrical resistivity of the active material.

Figure 5:
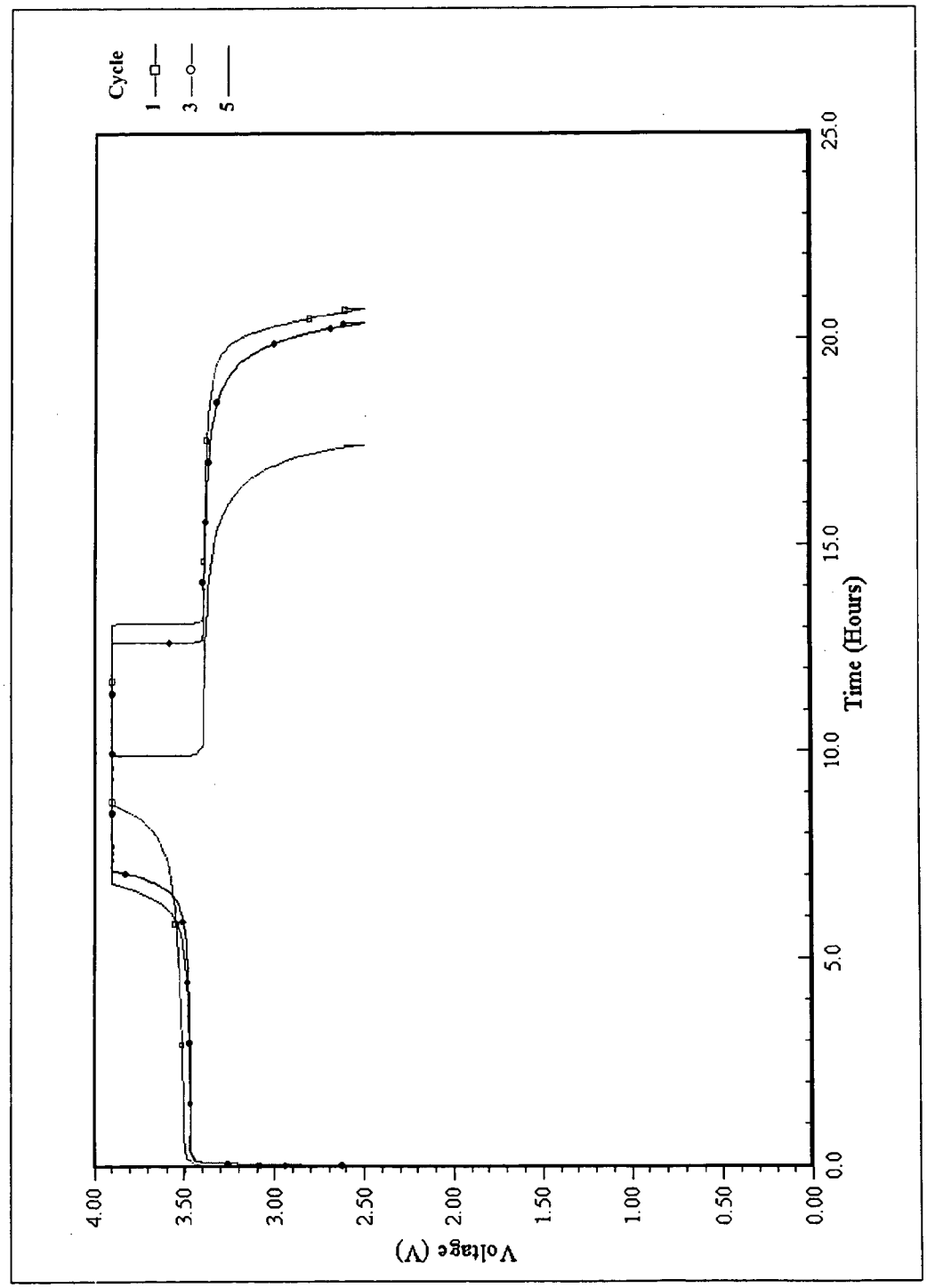
FIG. 5 is a voltage profile of the first, third and fifth discharge cycles for a 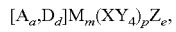$Li_{0.98}Mg_{0.01}$ $FePO_4$-containing cathode (100% $Li_{0.98}Mg_{0.01}$ $FePO_4$, 0% binder, 0% carbon) cycled in a cell using the test conditions described with respect to FIG. 2.
Figure 6:
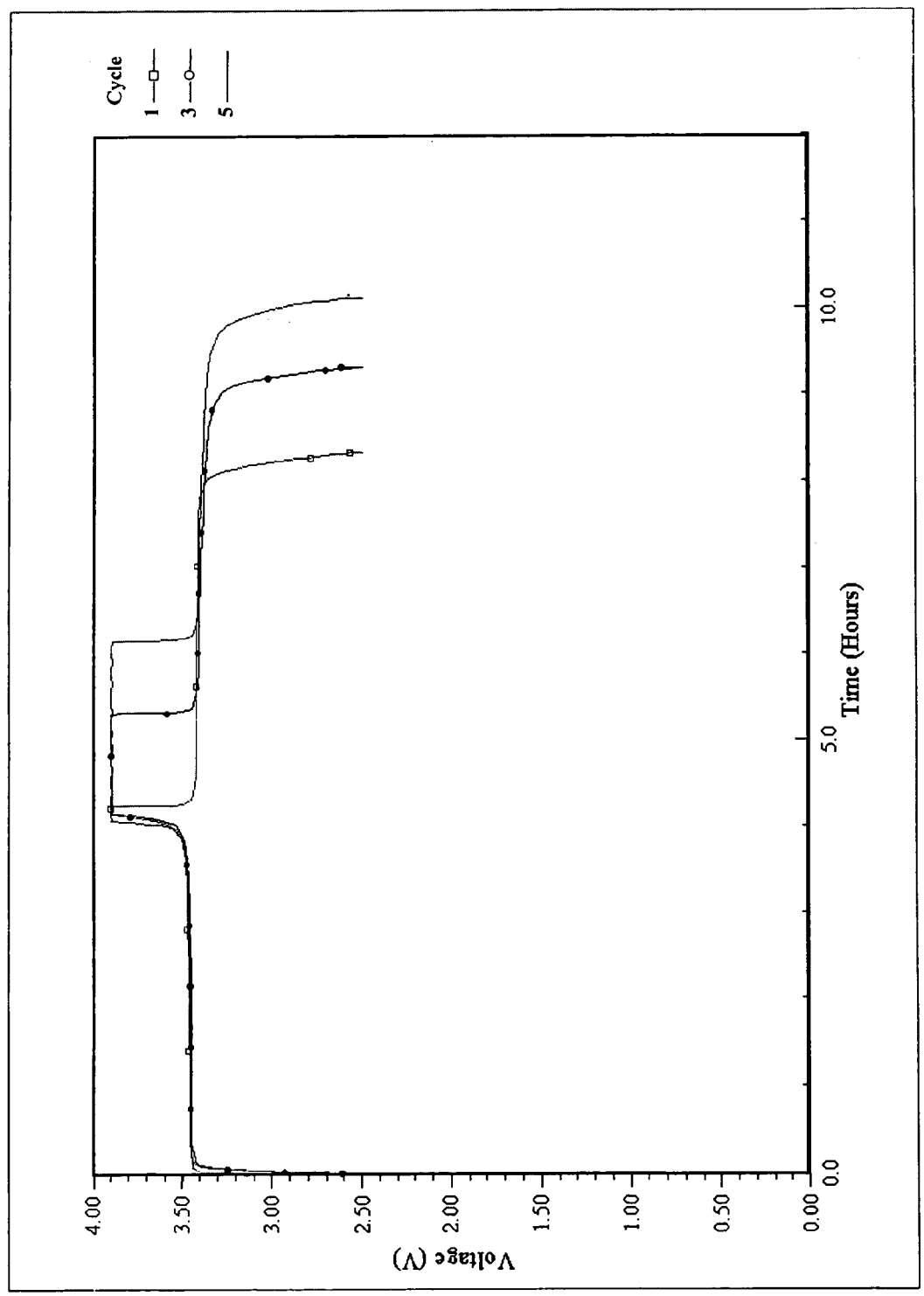
FIG. 6 is a voltage profile of the first, third and fifth discharge cycles for a $Li_{0.98}Mg_{0.05}Fe_{0.96}PO_4$-containing cathode (100% $Li_{0.98}Mg_{0.65}Fe_{0.96}PO_4$, 0% binder, 0% carbon) cycled in a cell using the test conditions described with respect to FIG. 2.
Figure 7:
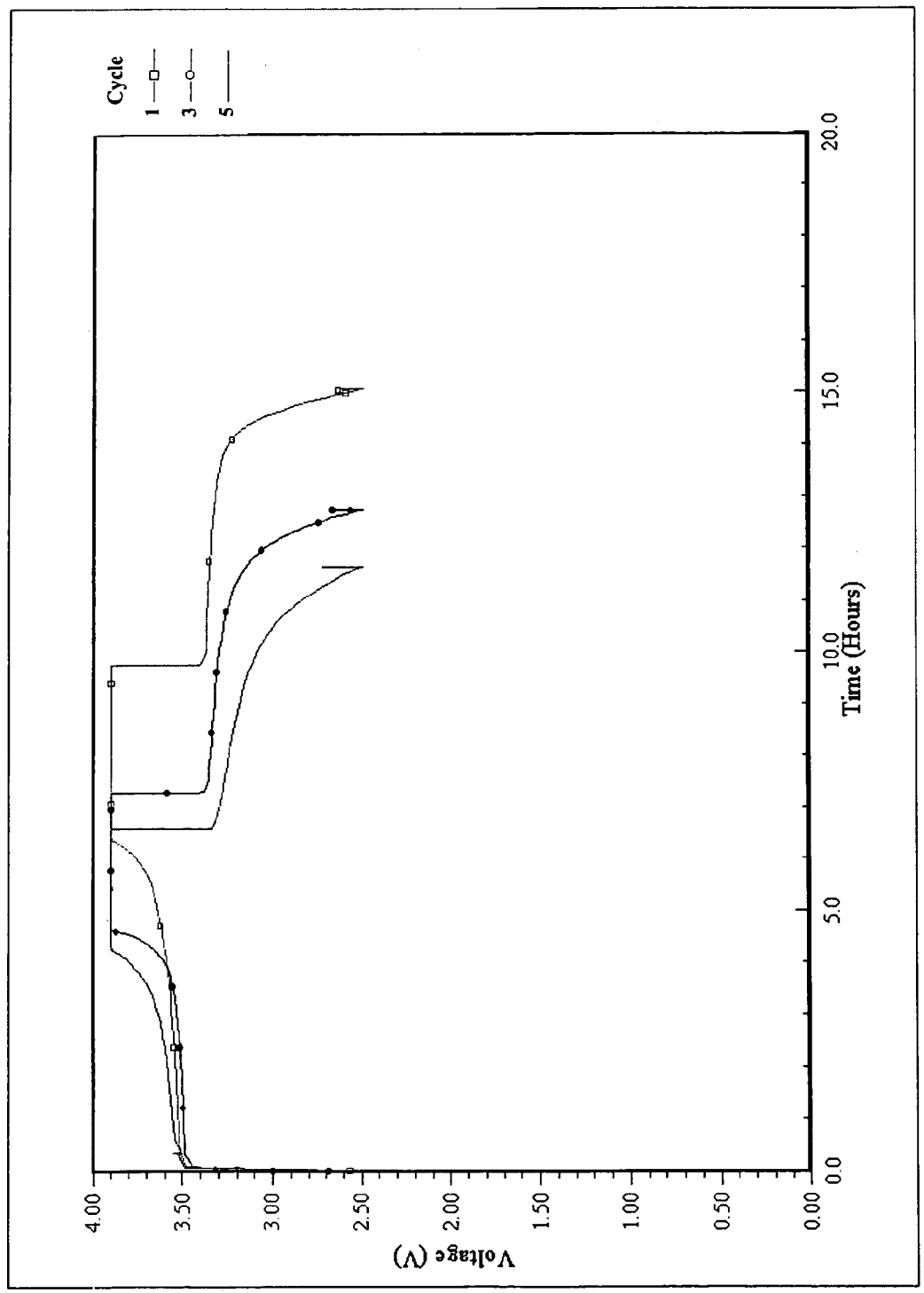
FIG. 7 is a voltage profile of the first, third and fifth discharge cycles for a $Li_{0.99}Nb_{0.002}FePO_4$-containing cathode (100% $Li_{0.99}Nb_{0.002}FePO_4$, 0% binder, 0% carbon) cycled in a cell using the test conditions described with respect to FIG. 2.

Electrochemical cells constructed using a disk cathode containing $Li_{0.98}Mg_{0.01}FePO_4$, $Li_{0.98}Mg_{0.05}Fe_{0.96}PO_4$, and $Li_{0.99}Nb_{0.002}FePO_4$ (0% binder, 0% carbon) were cycled per the conditions stated above. FIGS. 5, 6 and 7 are voltage profiles for the cells. As the profiles in FIGS. 5, 6 and 7 indicate, $LiFePO_4$ doped with Mg or Nb exhibited a significantly greater amount of capacity than undoped $LiFePO_4$, even in the absence of carbon. Table 14 below shows the charge capacity ($Q_c$) and discharge capacity ($Q_d$) for the active material contained in each electrochemical cell, as well as the corresponding capacity loss for each cycle. As Table 15 indicates, $Li_{0.98}Mg_{0.05}Fe_{0.96}PO_4$ active material (wherein the amount of Fe and Li are each dependent (reduced by) the amount of Mg dopant) exhibited superior performance, and high capacity.

TABLE 15

| Active Material and Theoretical Capacity | Cycle No. | $Q_c$ (mAh/g) | $Q_d$ (mAh/g) | Capacity Loss (%) |
|---|---|---|---|---|
| $LiFePO_4$ 169.9 mAh/g | 1 | 0.68 | 0.00077 | 99.89 |
|  | 2 | 0.03 | 0.00064 | 97.67 |

TABLE 15-continued

| Active Material and Theoretical Capacity | Cycle No. | $Q_c$ (mAh/g) | $Q_d$ (mAh/g) | Capacity Loss (%) |
|---|---|---|---|---|
| | 3 | 0.02 | 0.00064 | 96.69 |
| | 4 | 0.02 | 0.00061 | 96.03 |
| | 5 | 0.01 | 0.00064 | 95.68 |
| $Li_{0.98}Mg_{0.01}FePO_4$ | 1 | 130.35 | 100.57 | 22.85 |
| 166.4 mAh/g | 2 | 107.22 | 102.56 | 4.35 |
| | 3 | 114.80 | 102.16 | 11.01 |
| | 4 | 107.36 | 100.53 | 6.36 |
| | 5 | 105.86 | 99.25 | 6.24 |
| $Li_{0.98}Mg_{0.05}Fe_{0.96}PO_4$ | 1 | 149.6 | 148.4 | 0.9 |
| 164.3 mAh/g | 2 | 155.6 | 146.5 | 5.8 |
| | 3 | 159.5 | 145.5 | 8.8 |
| | 4 | 163.8 | 144.0 | 12.1 |
| | 5 | 161.6 | 137.0 | 15.2 |
| $Li_{0.98}Nb_{0.002}FePO_4$ | 1 | 133.62 | 98.28 | 26.45 |
| | 2 | 100.18 | 100.18 | 0.00 |
| | 3 | 100.80 | 99.02 | 1.77 |
| | 4 | 100.12 | 98.65 | 1.47 |
| | 5 | 95.09 | 93.05 | 2.15 |

Figure 8:
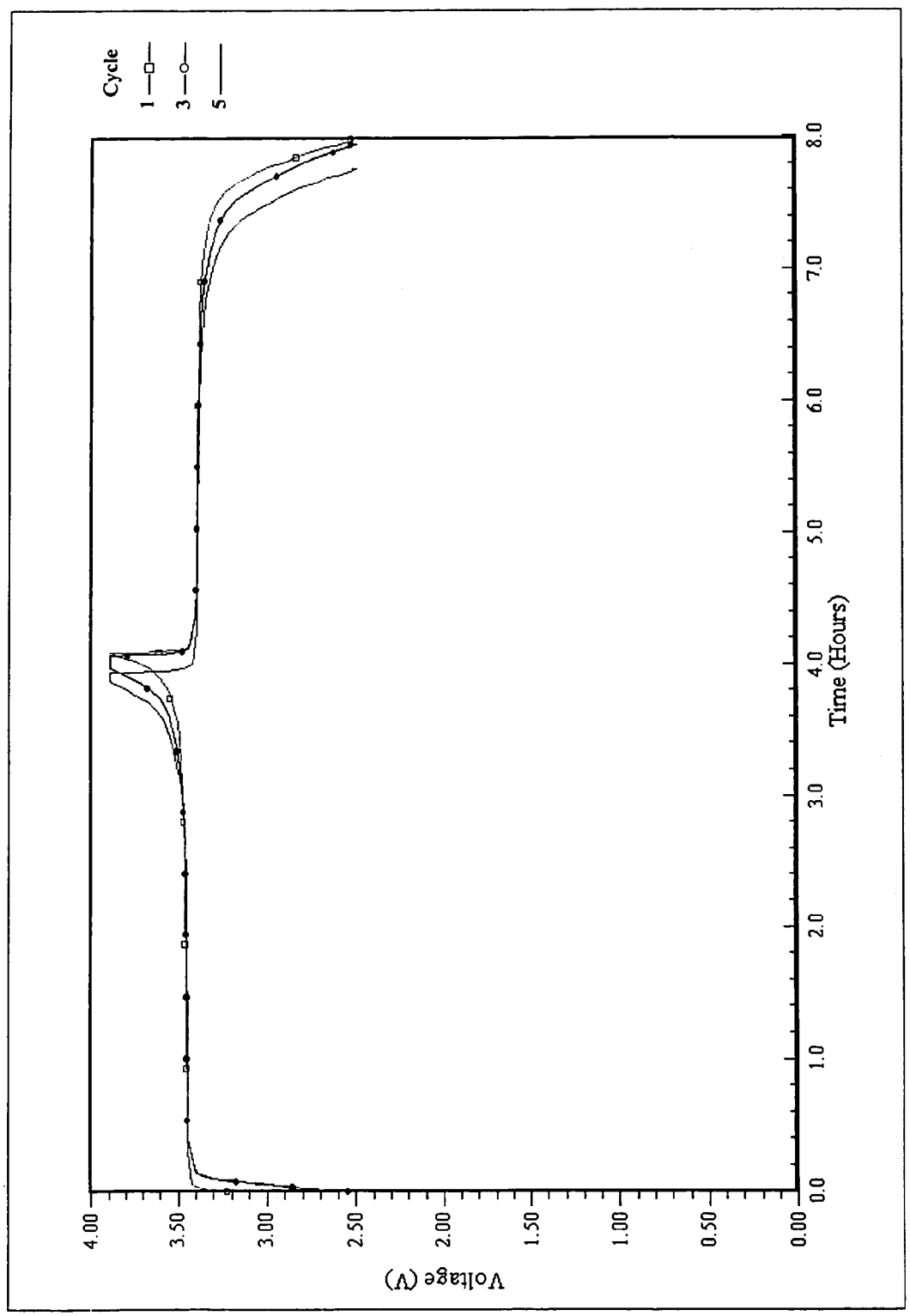
FIG. 8 is a voltage profile of the first, third and fifth discharge cycles for a $LiFePO_4/2.18\%$ carbon-containing cathode (0% binder) cycled in a cell using the test conditions described with respect to FIG. 2.

An electrochemical cell constructed using a disk cathode containing LiFePO$_4$ synthesized per the teaching of Example 12 using a low flow-rate inert atmosphere, was cycled per the conditions stated above. The reaction product contained approximately 2.18 wt % residual carbon. FIG. 8 is a voltage profile (voltage as a function of time) for the cell. As the profile in FIG. 8 indicates, the carbon-containing LiFePO$_4$ exhibited enhanced capacity and reduced fade as compared to the carbon-deficient counterpart.

Figure 9:
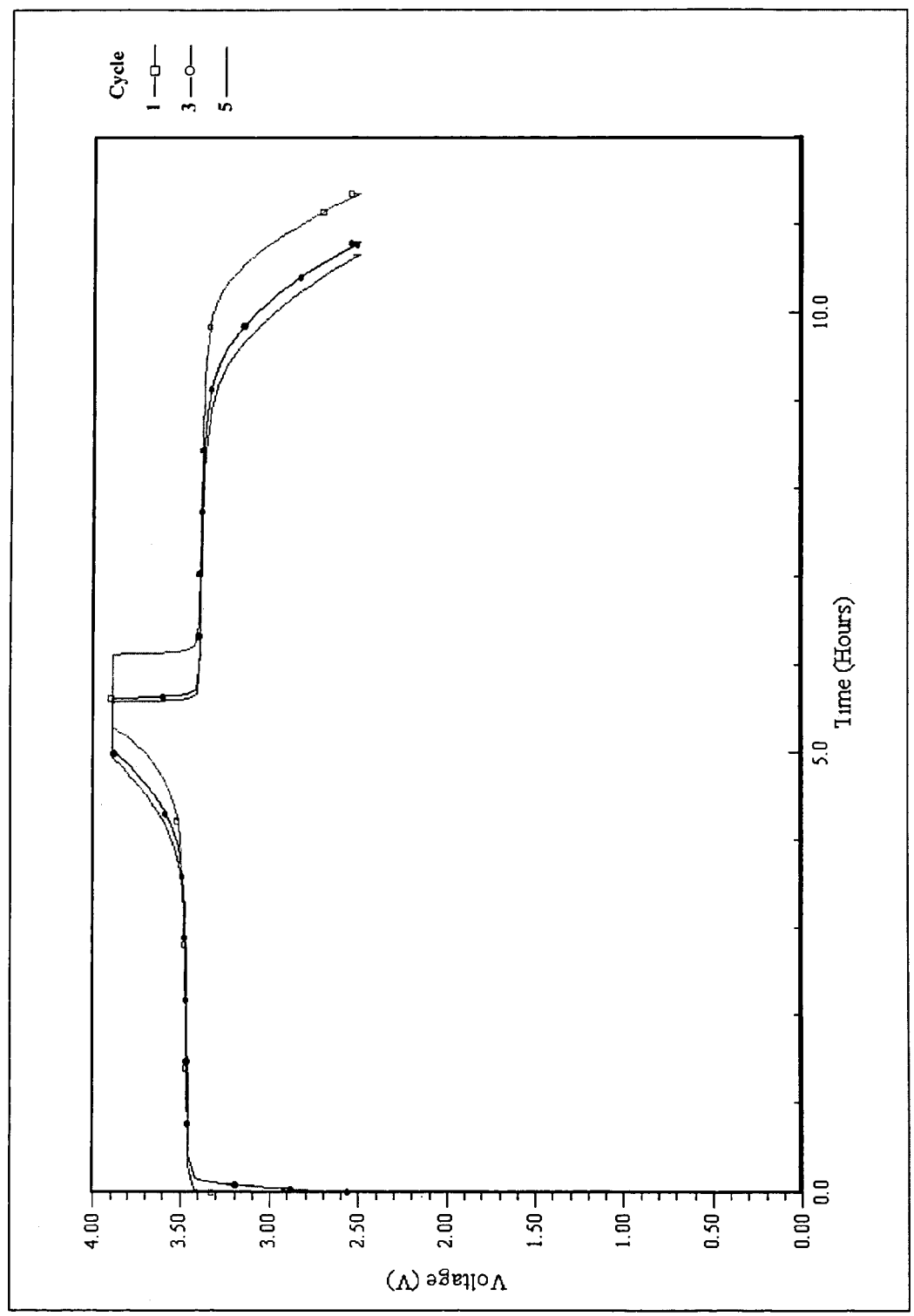
FIG. 9 is a voltage profile of the first, third and fifth discharge cycles for a $Li_{0.98}Mg_{0.01}FePO_4/1.88\%$ carbon-containing cathode (0% binder) cycled in a cell using the test conditions described with respect to FIG. 2.
Figure 10:
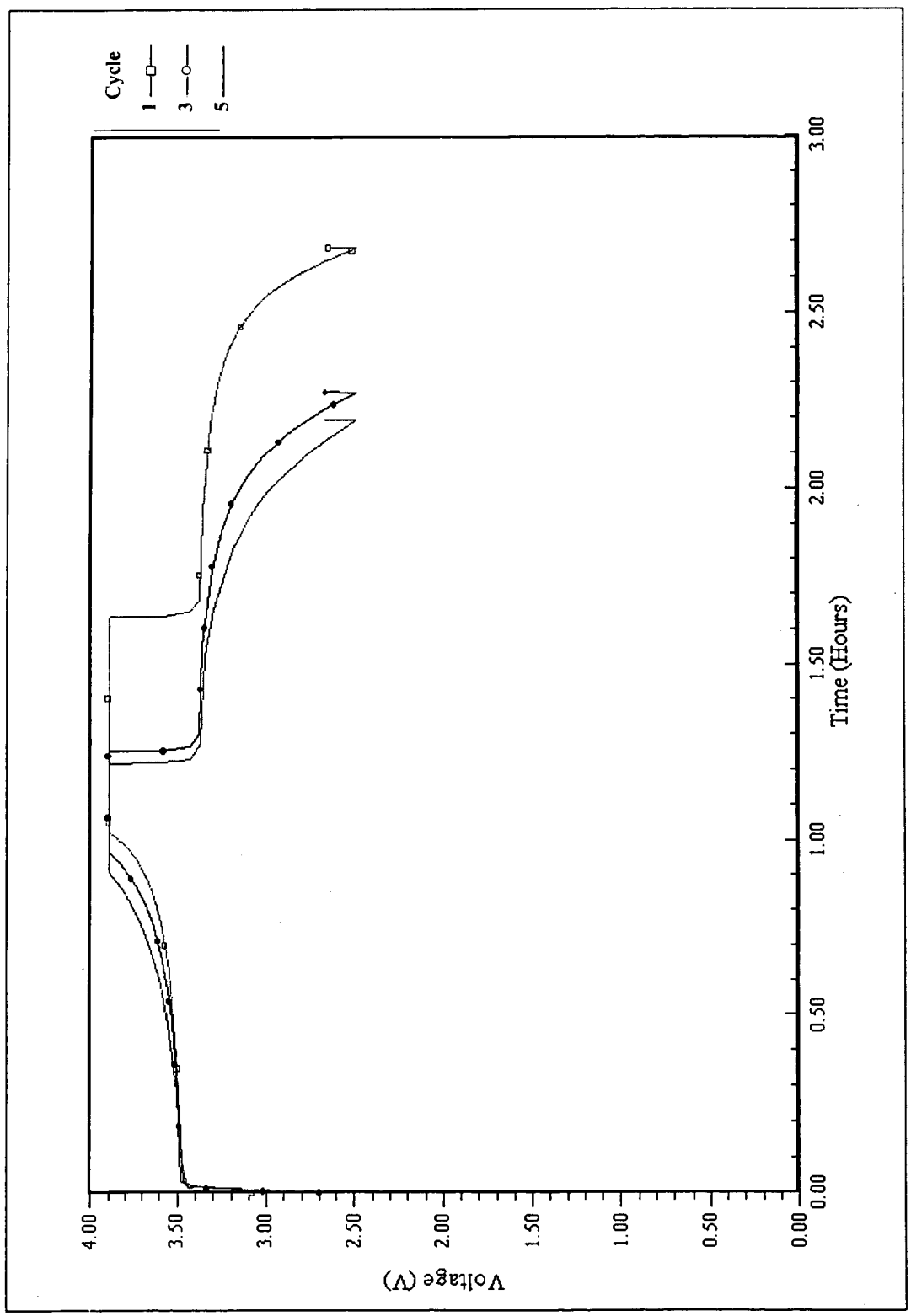
FIG. 10 is a voltage profile of the first, third and fifth discharge cycles for a $LiMg_{0.04}Fe_{0.96}PO_4/2.24\%$ carbon-containing cathode (0% binder) cycled in a cell using the test conditions described with respect to FIG. 2.
Figure 11:
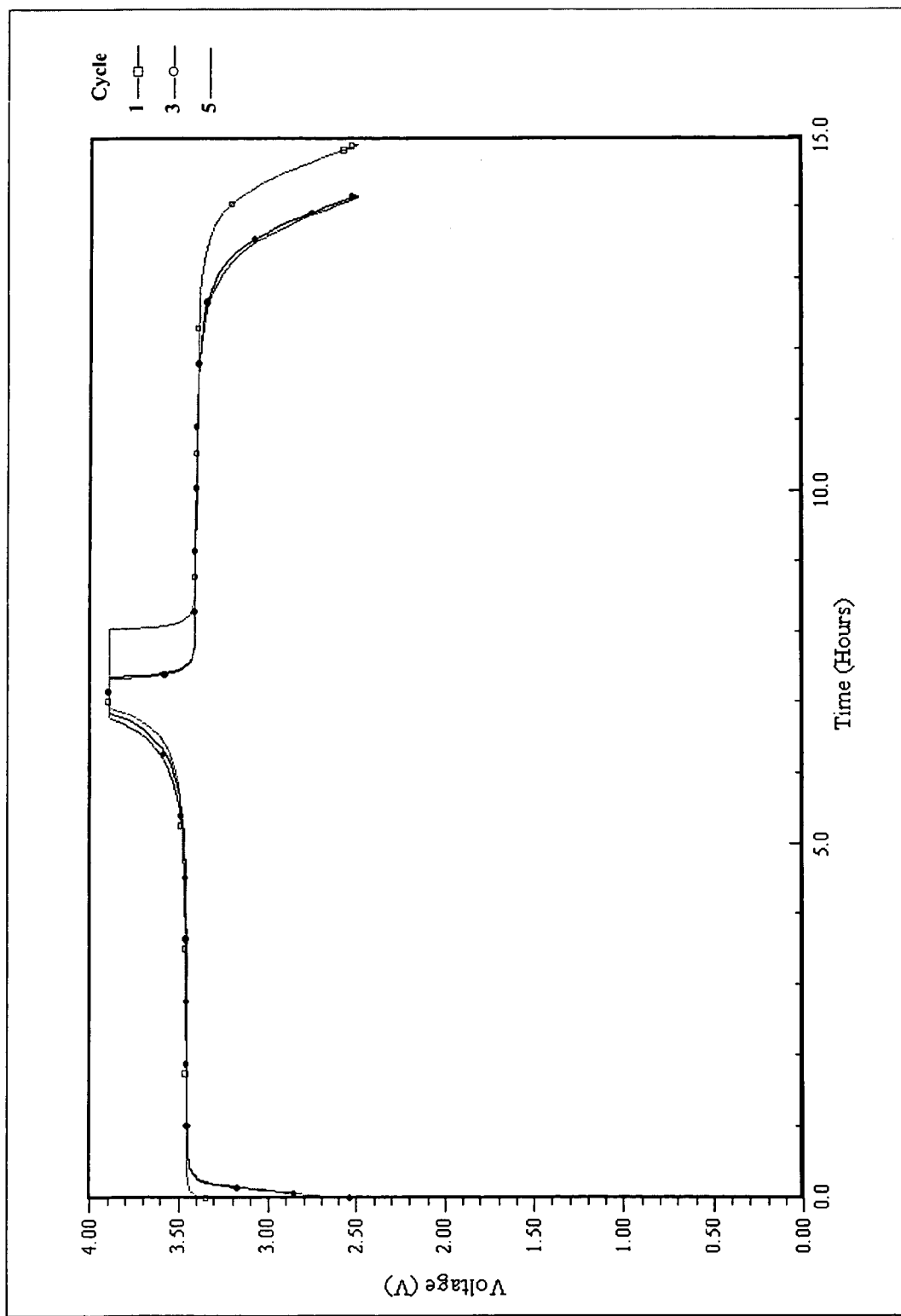
FIG. 11 is a voltage profile of the first, third and fifth discharge cycles for a $Li_{0.98}Mg_{0.05}Fe_{0.96}PO_4/1.98\%$ carbon-containing cathode (0% binder) cycled in a cell using the test conditions described with respect to FIG. 2.

Electrochemical cells constructed using a disk cathode containing $Li_{0.98}Mg_{0.01}FePO_4$, $LiMg_{0.04}Fe_{0.96}PO_4$, $Li_{0.98}Mg_{0.05}Fe_{0.96}PO_4$, each synthesized per the teachings of Example 12 using a low flow-rate inert atmosphere, were cycled per the conditions stated above. The reaction products contained approximately 1.88 wt %, 2.24 wt % and 1.98 wt % residual carbon, respectively. FIGS. 9, 10 and 11 are voltage profiles for the cells. As the profiles in FIGS. 9, 10 and 11 indicate, residual carbon-containing LiFePO$_4$ doped with Mg exhibited a significantly enhanced capacity and reduced fade as compared to the carbon-deficient counterparts. Table 16 below shows the charge capacity ($Q_c$) and discharge capacity ($Q_d$) for the active material contained in each electrochemical cell, as well as the corresponding capacity loss for each cycle. As Table 15 indicates, residual carbon-containing $Li_{0.98}Mg_{0.05}Fe_{0.96}PO_4$ active material (wherein the amount of Fe and Li are each dependent (reduced by) the amount of Mg dopant) exhibited superior performance, and high capacity.

TABLE 16

| Active Material/C wt %/Theoretical Capacity | Cycle No. | $Q_c$ (mAh/g) | $Q_d$ (mAh/g) | Capacity Loss (%) |
|---|---|---|---|---|
| LiFePO$_4$ | 1 | 156.4 | 146.9 | 6.1 |
| (2.18% C) | 2 | 156.4 | 147.7 | 5.6 |
| 169.9 mAh/g | 3 | 154.1 | 145.8 | 5.4 |
| | 4 | 150.7 | 144.6 | 4.0 |
| | 5 | 149.9 | 143.9 | 4.0 |
| $Li_{0.98}Mg_{0.01}FePO_4$ | 1 | 155.1 | 143.5 | 7.5 |
| 1.88% C | 2 | 148.5 | 141.6 | 4.6 |
| 166.4 mAh/g | 3 | 146.0 | 142.1 | 2.6 |
| | 4 | 146.0 | 139.9 | 4.2 |
| | 5 | 144.6 | 139.4 | 3.6 |
| $LiMg_{0.04}Fe_{0.96}PO_4$ | 1 | 148.1 | 133.5 | 9.8 |
| 2.24% C | 2 | 135.5 | 130.2 | 4.0 |
| 164.8 mAh/g | 3 | 134.8 | 130.2 | 3.4 |

TABLE 16-continued

| Active Material/C wt %/Theoretical Capacity | Cycle No. | $Q_c$ (mAh/g) | $Q_d$ (mAh/g) | Capacity Loss (%) |
|---|---|---|---|---|
| | 4 | 132.9 | 127.4 | 4.1 |
| | 5 | 129.8 | 124.3 | 4.2 |
| $Li_{0.98}Mg_{0.05}Fe_{0.96}PO_4$ | 1 | 159.2 | 152.3 | 4.4 |
| 1.98% C | 2 | 156.0 | 153.1 | 1.8 |
| 164.3 mAh/g | 3 | 155.8 | 151.5 | 2.8 |
| | 4 | 155.8 | 151.7 | 2.6 |
| | 5 | 154.8 | 151.3 | 2.3 |

An electrochemical cell constructed using a film cathode containing $Li_{0.98}Mg_{0.05}Fe_{0.96}PO_4$ (86% active material, 4% carbon, 10% binder) synthesized per the teaching of Example 12 using a high flow-rate inert atmosphere, was cycled per the conditions stated above. The carbon/binder-containing $Li_{0.98}Mg_{0.05}Fe_{0.96}PO_4$ active material exhibited excellent capacity and reduced fade. Table 17 below shows the average charge capacity ($Q_c$) and discharge capacity ($Q_d$) for the active material contained in the five electrochemical cells, as well as the corresponding capacity loss for each cycle.

TABLE 17

| Cycle No. | $Q_c$ (mAh/g) | $Q_d$ (mAh/g) | Capacity Loss (%) |
|---|---|---|---|
| 1 | 156.9 | 145.1 | 8.38 |
| 2 | 151.1 | 144.3 | 4.5 |
| 3 | 150.1 | 144.6 | 3.7 |
| 4 | 149.6 | 144.8 | 3.21 |
| 5 | 149.6 | 144.8 | 2.55 |
| 35 | 152.5 | 145.7 | 4.46 |

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A battery, comprising:
   a first electrode comprising a compound represented by the general nominal formula:

$[A_a,D_d]M_mPO_4$, wherein:
   (i) A is Li, and $0<a\leq 2$;
   (ii) D is Nb, and $0<d\leq 1$;
   (iii) M is Fe and is partially substituted by D by aliovalent or isocharge substitution, the elements selected for D for the substitution of A and M are the same or different from one another,

$V^M$ is the oxidation state of M and $V^D$ is the oxidation state of D, v>0, u>0, and $1\leq m\leq 3$;
   (iv) wherein A, D, M, a, d, m, u and v are selected so as to maintain electroneutrality of the compound;
   the battery further comprising a second counter-electrode comprising an intercalation active material; selected from the group consisting of a transition metal oxide, a metal chalcogenide, carbon and mixtures thereof and an electrolyte.

2. The battery of claim 1, wherein the compound is represented by the general nominal formula $$[A_{a-\frac{f}{V^A}}, D_{\frac{d}{V^D}}]M_mPO_4,$$

wherein f=d, $V^A$ is the oxidation state of A and $V^D$ is the oxidation state of D; and
wherein M=

$$[M_{m-\frac{u}{V^M}}, D_{\frac{v}{V^D}}],$$

$V^M$ is the oxidation state of M and $V^D$ is the oxidation state of D, v>0, u>0, and $1 \leq m \leq 2$.

3. The battery of claim 1, wherein the compound is represented by the general nominal formula $$[A_{a-\frac{f}{V^A}}, D_{\frac{d}{V^D}}]M_mPO_4,$$

wherein f≠d, $V^A$ is the oxidation state of A and $V^D$ is the oxidation state of D; and
wherein M=

$$[M_{m-\frac{u}{V^M}}, D_{\frac{v}{V^D}}],$$

$V^M$ is the oxidation state of M and $V^D$ is the oxidation state of D, v>0, u>0, and $1 \leq m \leq 2$.

4. The battery of claim 1, wherein the counter-electrode comprises graphite.

* * * * *

UNITED STATES PATENT AND TRADEMARK OFFICE
CERTIFICATE OF CORRECTION

Page 1 of 1

PATENT NO.       : 7,718,317 B2
APPLICATION NO.  : 10/741257
DATED            : May 18, 2010
INVENTOR(S)      : Adamson et al.

It is certified that error appears in the above-identified patent and that said Letters Patent is hereby corrected as shown below:

Column 9
Line 32:  Delete "$R^{1+}$"; Insert -- $Ru^{1+}$ --
Line 42:  Delete "$R^{1+}$"; Insert -- $Ru^{1+}$ --
Line 52:  Delete "$R^{1+}$"; Insert -- $Ru^{1+}$ --

Column 10 Line 8
Delete "not 0,"
Insert -- not O, --

Signed and Sealed this
Twelfth Day of July, 2011

David J. Kappos
*Director of the United States Patent and Trademark Office*